(12) United States Patent
Lee et al.

(10) Patent No.: US 10,805,529 B2
(45) Date of Patent: Oct. 13, 2020

(54) ELECTRONIC DEVICE AND METHOD FOR DISPLAYING 360-DEGREE IMAGE IN THE ELECTRONIC DEVICE

(71) Applicant: Samsung Electronics Co., Ltd., Suwon-si, Gyeonggi-do (KR)

(72) Inventors: Gun-Ho Lee, Hwaseong-si (KR); Hae-Young Park, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 65 days.

(21) Appl. No.: 15/895,443

(22) Filed: Feb. 13, 2018

(65) Prior Publication Data
US 2018/0241943 A1    Aug. 23, 2018

(30) Foreign Application Priority Data
Feb. 20, 2017    (KR) .................. 10-2017-0022505

(51) Int. Cl.
*H04N 5/232*    (2006.01)
*H04N 5/247*    (2006.01)

(52) U.S. Cl.
CPC ..... *H04N 5/23238* (2013.01); *H04N 5/23216* (2013.01); *H04N 5/23293* (2013.01); *H04N 5/23296* (2013.01); *H04N 5/247* (2013.01)

(58) Field of Classification Search
None
See application file for complete search history.

(56) References Cited

U.S. PATENT DOCUMENTS

| 2006/0187305 A1* | 8/2006 | Trivedi | G06K 9/00234 348/169 |
| 2012/0206565 A1* | 8/2012 | Villmer | H04N 1/00 348/36 |
| 2012/0307052 A1* | 12/2012 | Thiruvengada | H04N 7/183 348/143 |

(Continued)

FOREIGN PATENT DOCUMENTS

| JP | 2012-029180 A | 2/2012 |
| KR | 10-1181967 B1 | 9/2012 |

OTHER PUBLICATIONS

Using the Navigation Controls in Google Earth, URL:http://www.spatialsci.com/files/documents/Navigation%20Controls%20in%20Google%20Earth.pdf, Jul. 20, 2010, XP055468641.

(Continued)

*Primary Examiner* — Dakshesh D Parikh
(74) *Attorney, Agent, or Firm* — Jefferson IP Law, LLP

(57) ABSTRACT

A method for displaying a 360-degree image in an electronic device, and an electronic device thereof are disclosed. The apparatus includes a display, and a at least one processor connected operatively to the display. The at least one processor is configured to acquire 360-degree image data and metadata corresponding to the 360-degree image data, and display an object including a first indicator and a second indicator on the display by using the metadata. The first indicator indicates an angle of view or capturing x-direction along a horizontal direction in a three-dimensional (3D) model space for a first area of the 360-degree image data, and the second indicator indicates an angle of view or capturing y-direction along a vertical direction in the 3D model space.

18 Claims, 20 Drawing Sheets

(56) References Cited

U.S. PATENT DOCUMENTS

2015/0304724 A1   10/2015  Prosserman et al.
2016/0098138 A1*  4/2016  Park .................... G06F 3/0416
                                                                         345/173

OTHER PUBLICATIONS

European Search Report dated Mar. 13, 2020; European Appln. No. 18 157 253.8-1208.

* cited by examiner

ELECTRONIC DEVICE AND METHOD FOR DISPLAYING 360-DEGREE IMAGE IN THE ELECTRONIC DEVICE

CROSS-REFERENCE TO RELATED APPLICATION(S)

This application claims the benefit under 35 U.S.C. § 119(a) of a Korean patent application filed on Feb. 20, 2017 in the Korean Intellectual Property Office and assigned Serial number 10-2017-0022505, the entire disclosure of which is hereby incorporated by reference.

TECHNICAL FIELD

The present disclosure relates to an electronic device and method for displaying an image in the electronic device.

BACKGROUND

Along with the recent development of cameras and image processing technologies, many devices capable of capturing a 360-degree image and reproducing the captured 360-degree image have been developed and used.

A 360-degree image may be a 360-degree multi-view image captured by a plurality of cameras, and an omni-directional image captured in all directions. The captured omni-directional image may be converted to a three-dimensional (3D) image through mapping onto the surface of a 3D model, for example, a sphere, a cube, or a cylinder, and the 3D image may be reproduced in a display-enabled electronic device. For example, a 3D image may be reproduced in an electronic device capable of displaying a 3D image, such as a head mounted display (HMD) device or a smartphone. As the electronic device displays a scene corresponding to a specific view in the 3D image by rendering the scene, so that a user may view the scene corresponding to the specific view of the 3D image.

Different cameras may be used for different views of a 360-degree image. In a method for displaying a 360-degree image, information about a camera used for each view of a 360-degree image is not provided according to the related art. Therefore, a user may not know which one of a plurality of cameras has been used for each view of the 360-degree image. For example, the 360-degree image display method, according to the related art, does not provide information indicating a camera which has captured a current displayed image of a specific view among the plurality of cameras. Thus, the user may not view an image captured by a specific camera selected from among the plurality of cameras in the 360-degree image, which is inconvenient to the user.

The 360-degree image display method, according to the related art, does not provide information indicating the direction of a view corresponding to the current displayed image of the whole 360-degree image, among horizontal directions (for example, left and right directions) and vertical directions (for example, up and down directions). To display an image corresponding to an intended view of the 360-degree image, the user may inconveniently have to apply a plurality of directional inputs such as up, down, left or right through an input device.

In the 360-degree image display method, according to the related art, an image corresponding to a specific view should be zoomed in or zoomed out through an input device. Moreover, after zoom-in or zoom-out, only the zoomed-in or zoomed-out image is displayed without information indicating whether the displayed image corresponding to the specific view has been zoomed in or zoomed out, which may be inconvenient to the user.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device for providing information indicating a camera which has captured a current view image, among a plurality of cameras, and a method for displaying a 360-degree image in the electronic device.

Another aspect of the present disclosure is to provide an electronic device for providing information indicating the direction of a view corresponding to a current view image of a 360-degree image, among horizontal and vertical directions, and a method for displaying a 360-degree image in the electronic device.

Another aspect of the present disclosure is to provide an electronic device for enabling an input for zooming in or zooming out a current view image and, at the same time, providing information indicating whether the current view image is in a zoomed-in or zoomed-out state, and a method for displaying a 360-degree image in the electronic device.

In accordance with an aspect of the present disclosure, an electronic device is provided. The electronic device includes a display, and at least one processor operatively connected to the display. The at least one processor is configured to acquire 360-degree image data and metadata corresponding to the 360-degree image data, and display an object including a first indicator and a second indicator on the display, using the metadata. The first indicator indicates an angle of view or capturing x-direction along a horizontal direction in a three-dimensional (3D) model space for a first area of the 360-degree image data, and the second indicator indicates an angle of view or capturing y-direction along a vertical direction in the 3D model space.

In accordance with another aspect of the present disclosure, a method for displaying a 360-degree image in an electronic device is provided. The method includes acquiring 360-degree image data and metadata corresponding to the 360-degree image data, and displaying an object including a first indicator and a second indicator on a display, using the metadata. The first indicator indicates an angle of view or capturing x-direction along a horizontal direction in a 3D model space for a first area of the 360-degree image data, and the second indicator indicates an angle of view or capturing y-direction along a vertical direction in the 3D model space.

In accordance with another aspect of the present disclosure, a non-transitory computer-readable storage medium configured to store one or more computer programs including instructions for displaying a 360-degree image in an electronic device is provided. The one or more programs, when executed by at least one processor, cause the at least one processor to acquire 360-degree image data and metadata corresponding to the 360-degree image data, and display an object including a first indicator and a second indicator on a display, using the metadata. The first indicator indicates an angle of view or capturing x-direction along a horizontal direction in a 3D model space for a first area of the 360-degree image data, and the second indicator indicates an angle of view or capturing y-direction along a vertical direction in the 3D model space.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
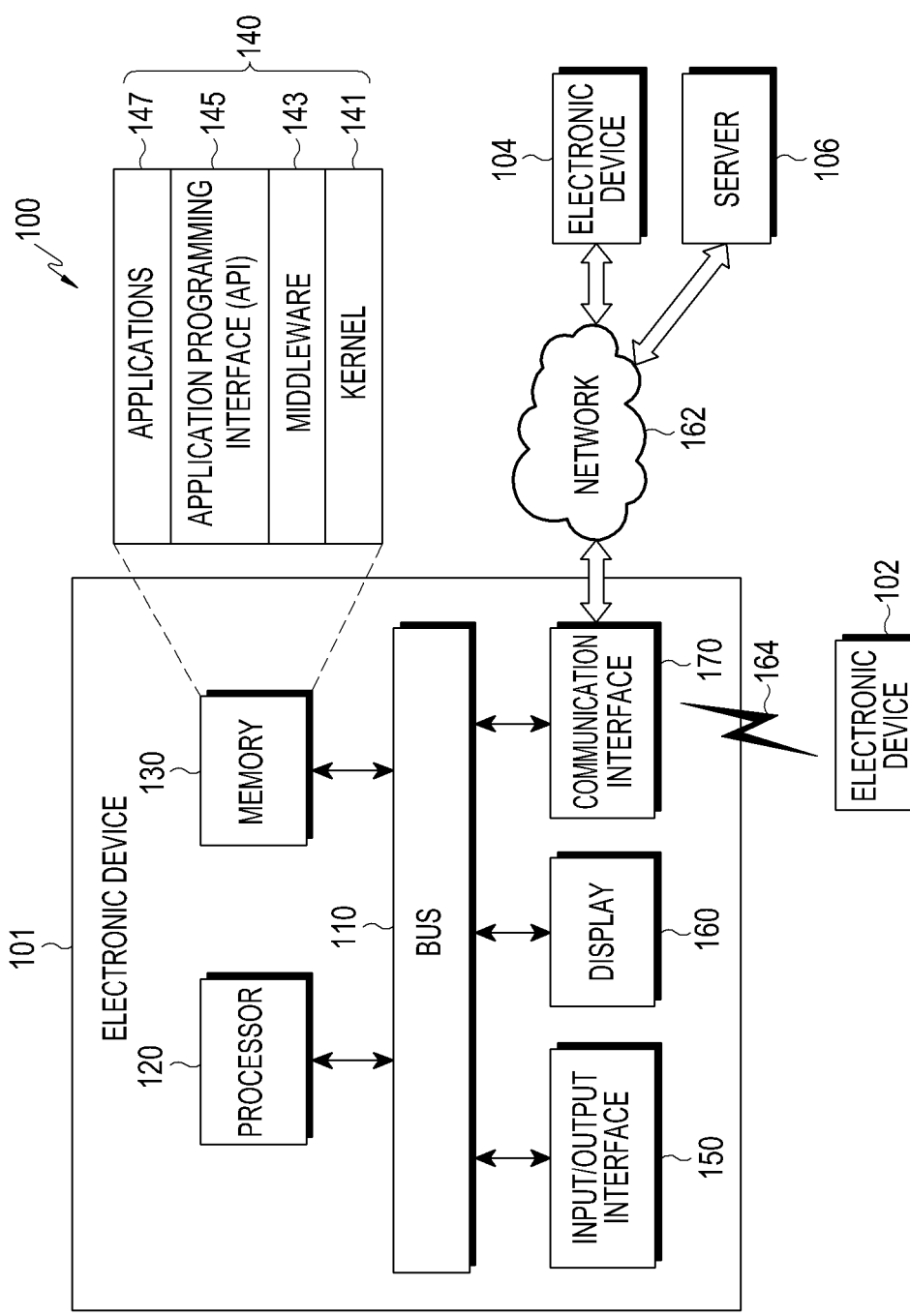
FIG. 1 is a block diagram of a network environment including electronic devices according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

However, the embodiments and terms as used herein are not intended to limit technologies described in the present disclosure to the particular embodiments, and it is to be understood that the present disclosure covers various modifications, equivalents, and/or alternatives to the embodiments. In relation to a description of the drawings, like reference numerals denote the same components. In the present disclosure, the term 'A or B', or 'at least one of A and/or B' may cover all possible combinations of enumerated items. The term as used in the present disclosure, 'first' or 'second' may modify the names of components irrespective of sequence or importance. These expressions are used to distinguish one component from another component, not limiting the components. When it is said that a component (for example, a first component) is '(operatively or communicatively) coupled with/to' or 'connected to' another component (for example, a second component), it should be understood that the one component is connected to the other component directly or through any other component (for example, a third component).

The term 'configured to' as used herein may be replaced with, for example, the term 'suitable for' 'having the capacity to', 'designed to', 'adapted to', 'made to', or 'capable of' in hardware or software. The term 'configured to' may mean that a device is 'capable' of with another device or part. For example, 'a processor configured to execute A, B, and C' may mean a dedicated processor (for example, an embedded processor) for performing the corresponding operations or a generic-purpose processor (for example, a central processing unit (CPU) or an application processor (AP)) for performing the operations.

According to various embodiments of the present disclosure, an electronic device may be at least one of, for example, a smart phone, a tablet personal computer (PC), a mobile phone, a video phone, an e-Book reader, a desktop PC, a laptop PC, a netbook computer, a workstation, a server, a personal digital assistant (PDA), a portable multimedia player (PMP), a moving picture experts group (MPEG-1 or MPEG-2) audio layer-3 (MP3) player, medical equipment, a camera, or a wearable device. The wearable device may be at least one of an accessory type (for example, a watch, a ring, a bracelet, an ankle bracelet, a necklace, glasses, contact lenses, or a head mounted device (HMD)), a fabric or clothes type (for example, electronic clothes), an attached type (for example, a skin pad or a tattoo), or an implantable circuit. According to some embodiments, an electronic device may be at least one of a television (TV), a digital versatile disc (DVD) player, an audio player, a refrigerator, an air conditioner, a vacuum cleaner, an oven, a microwave oven, a washer, an air purifier, a set-top box, a home automation control panel, a security control panel, a media box (for example, Samsung HomeSync™, Apple TV™, Google TV™, or the like), a game console (for example, Xbox™, PlayStation™, or the like), an electronic dictionary, an electronic key, a camcorder, or an electronic picture frame.

According to other embodiments, an electronic device may be at least one of a medical device (for example, a portable medical meter such as a blood glucose meter, a heart rate meter, a blood pressure meter, or a body temperature meter, a magnetic resonance angiography (MRA) device, a magnetic resonance imaging (MRI) device, a computed tomography (CT) device, an imaging device, an ultrasonic device, or the like), a navigation device, a global navigation satellite system (GNSS), an event data recorder (EDR), a flight data recorder (FDR), an automotive infotainment device, a naval electronic device (for example, a naval navigation device, a gyrocompass, or the like), an avionic electronic device, a security device, an in-vehicle head unit, an industrial or consumer robot, a drone, an automatic teller machine (ATM) in a financial facility, a point of sales (POS) device in a shop, or an Internet of things (IoT) device (for example, a lighting bulb, various sensors, a sprinkler, a fire alarm, a thermostat, a street lamp, a toaster, sports goods, a hot water tank, a heater, or a boiler). According to some embodiments, an electronic device may be at least one of furniture, part of a building/structure or a vehicle, an electronic board, an electronic signature receiving device, a projector, and various measuring devices (for example, water, electricity, gas or electro-magnetic wave measuring devices). According to various embodiments, an electronic device may be flexible or a combination of two or more of the foregoing devices. According to an embodiment of the present disclosure, an electronic device is not limited to the foregoing devices. In the present disclosure, the term 'user' may refer to a person or device (for example, artificial intelligence electronic device) that uses an electronic device.

FIG. 1 is a block diagram of a network environment including electronic devices according to various embodiments of the present disclosure.

Referring to FIG. 1, an electronic device 101 in a network environment 100 according to various embodiments is described. The electronic device 101 may include a bus 110, a processor 120 (e.g., at least one processor), a memory 130, an input/output (I/O) interface 150, a display 160, and a communication interface 170 (e.g., a transceiver). In some embodiments, at least one of the components may be omitted in the electronic device 101 or a component may be added to the electronic device 101. The bus 110 may include a circuit that interconnects, the foregoing components 120, 130, 150, 160, and 170 and allows communication (for example, control messages and/or data) between the foregoing components. The processor 120 may include one or more of a CPU, an AP, or a communication processor (CP). The processor 120 may, for example, execute computation or data processing related to control and/or communication of at least one other component of the electronic device 101. The processor 120 may be called a controller.

The memory 130 may include a volatile memory and/or a non-volatile memory. The memory 130 may, for example, store instructions or data related to at least one other component of the electronic device 101. According to an embodiment, the memory 130 may store software and/or programs 140. The programs 140 may include, for example, a kernel 141, middleware 143, an application programming interface (API) 145, and/or application programs (or applications) 147. At least a part of the kernel 141, the middleware 143, and the API 145 may be called an operating system (OS). The kernel 141 may control or manage system resources (for example, the bus 110, the processor 120, or the memory 130) that are used in executing operations or functions implemented in other programs (for example, the middleware 143, the API 145, or the application programs 147). Also, the kernel 141 may provide an interface for allowing the middleware 143, the API 145, or the application programs 147 to access individual components of the electronic device 101 and control or manage system resources.

The middleware 143 may serve as a medium through which the kernel 141 may communicate with, for example, the API 145 or the application programs 147 to transmit and receive data. Also, the middleware 143 may process one or more task requests received from the application programs 147 according to their priority levels. For example, the middleware 143 may assign priority levels for using system resources (the bus 110, the processor 120, or the memory 130) of the electronic device 101 to at least one of the application programs 147, and process the one or more task requests according to the priority levels. The API 145 is an interface for the applications 147 to control functions that the kernel 141 or the middleware 143 provides. For example, the API 145 may include at least one interface or function (for example, a command) for file control, window control, video processing, or text control. The I/O interface 150 may, for example, provide a command or data received from a user or an external device to the other component(s) of the electronic device 101, or output a command or data received from the other component(s) of the electronic device 101 to the user or the external device.

The display 160 may include, for example, a liquid crystal display (LCD), a light emitting diode (LED) display, an organic LED (OLED) display, a microelectromechanical systems (MEMS) display, or an electronic paper display. The display 160 may display, for example, various types of content (for example, text, an image, a video, an icon, and/or a symbol) to the user. The display 160 may include a touch screen and receive, for example, a touch input, a gesture input, a proximity input, or a hovering input through an electronic pen or a user's body part. The communication interface 170 may establish communication, for example, between the electronic device 101 and an external device (for example, a first external electronic device 102, a second external electronic device 104, or a server 106). For example, the communication interface 170 may be connected to a network 162 by wireless communication or wired communication, and communicate with the external device (for example, the second external electronic device 104 or the server 106) over the network 162.

The wireless communication may include cellular communication conforming to, for example, at least one of long term evolution (LTE), LTE-advanced (LTE-A), code division multiple access (CDMA), wideband CDMA (WCDMA), universal mobile telecommunication system (UMTS), wireless broadband (WiBro), or global system for mobile communications (GSM). According to an embodiment, the wireless communication may include, for example, at least one of wireless fidelity (Wi-Fi), Bluetooth (BT), BT low energy (BLE), Zigbee, near field communication (NFC), magnetic secure transmission (MST), radio frequency (RF), or body area network (BAN), as indicated by reference numeral 164 in FIG. 1. According to an embodiment, the wireless communication may include GNSS. GNSS may be, for example, global positioning system (GPS), global navigation satellite system (Glonass), Beidou navigation satellite system (hereinafter, referred to as 'Beidou'), or Galileo, the European global satellite-based navigation system. In the present disclosure, the terms 'GPS' and 'GNSS' are interchangeably used with each other. The wired communication may be conducted in conformance to, for example, at least one of universal serial bus (USB), high definition multimedia interface (HDMI), recommended standard 232 (RS-232), power line communication, or plain old telephone service (POTS). The network 162 may be a telecommunication network, for example, at least one of a computer network (for example, local area network (LAN) or wide area network (WAN)), the Internet, or a telephone network.

Each of the first and second external electronic devices 102 and 104 may be of the same type as or a different type from the electronic device 101. According to various embodiments, all or a part of operations performed in the electronic device 101 may be performed in one or more other electronic devices (for example, the electronic devices 102 and 104) or the server 106. According to an embodiment, if the electronic device 101 is to perform a function or a service automatically or upon request, the electronic device 101 may request at least a part of functions related to the function or the service to another device (for example, the electronic device 102 or 104 or the server 106), instead of performing the function or the service autonomously, or additionally. The other electronic device (for example, the electronic device 102 or 104 or the server 106) may execute the requested function or an additional function and provide a result of the function execution to the electronic device 101. The electronic device 101 may provide the requested function or service based on the received result or by additionally processing the received result. For this purpose, for example, cloud computing, distributed computing, or client-server computing may be used.

Figure 2:
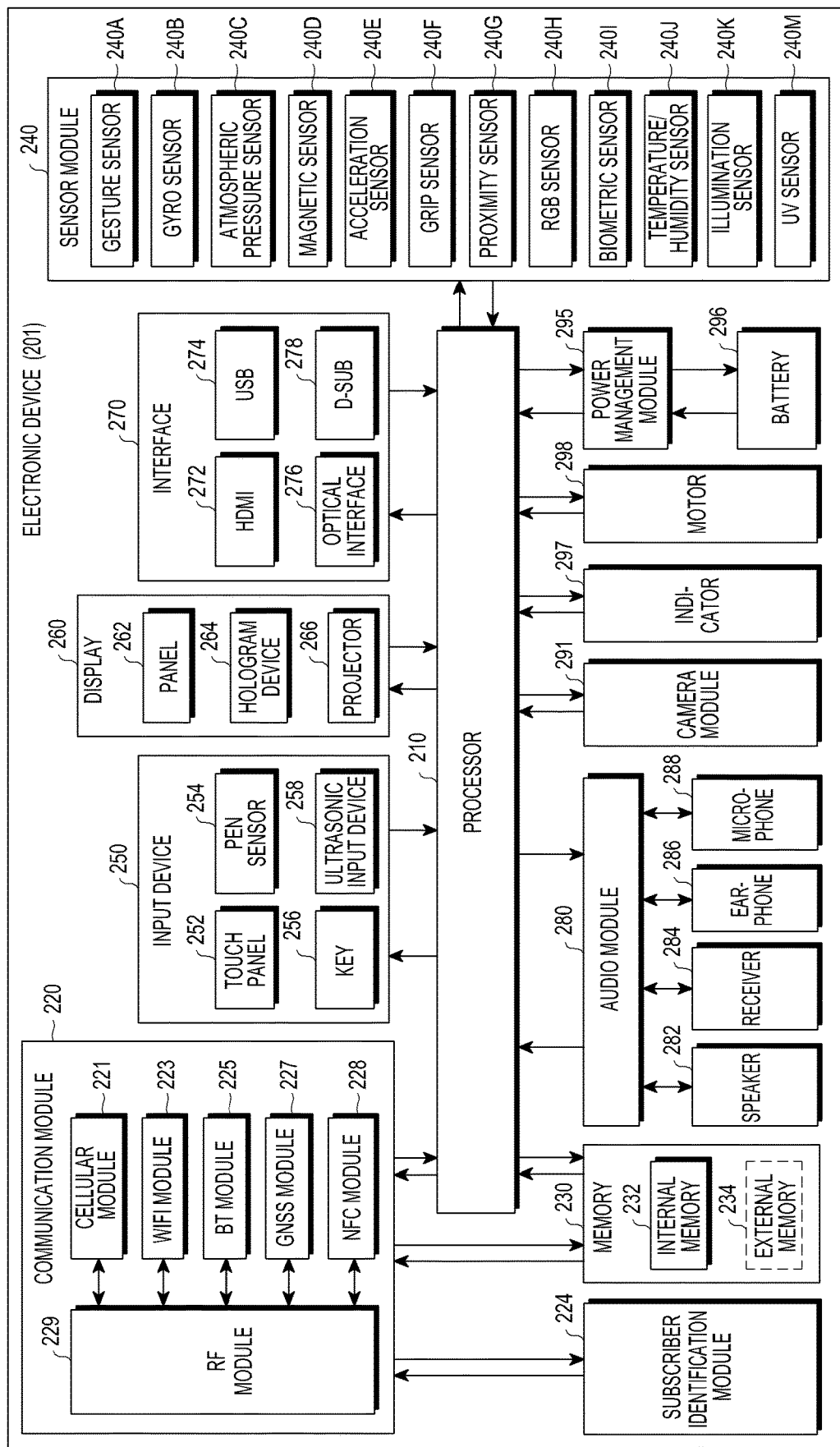
FIG. 2 is a block diagram of an electronic device according to various embodiments of the present disclosure.

FIG. 2 is a block diagram of an electronic device according to various embodiments of the present disclosure.

An electronic device 201 may include, for example, the whole or part of the electronic device 101 illustrated in FIG. 1. The electronic device 201 may include at least one processor (for example, AP) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298. The processor 210 may, for example, control a plurality of hardware or software components that are connected to the processor 210 by executing an OS or an application program, and may perform processing or computation of various types of data. The processor 210 may be implemented, for example, as a system on chip (SoC). According to an embodiment, the processor 210 may further include a graphics processing unit (GPU) and/or an image signal processor (ISP). The processor 210 may include at least a part (for example, a cellular module 221) of the components illustrated in FIG. 2. The processor 210 may load a command or data received from at least one of other components (for example, a non-volatile memory), process the loaded command or data, and store result data in the non-volatile memory.

The communication module 220 may have the same configuration as or a similar configuration to that of the communication interface 170. The communication module 220 may include, for example, the cellular module 221, a Wi-Fi module 223, a BT module 225, a GNSS module 227, an NFC module 228, and an RF module 229. The cellular module 221 may provide services such as voice call, video call, text service, or the Internet service, for example, through a communication network. According to an embodiment, the cellular module 221 may identify and authenticate the electronic device 201 within a communication network, using the SIM (for example, a SIM card) 224. According to an embodiment, the cellular module 221 may perform at least a part of the functionalities of the processor 210. According to an embodiment, the cellular module 221 may include a CP. According to an embodiment, at least a part (for example, two or more) of the cellular module 221, the Wi-Fi module 223, the BT module 225, the GNSS module 227, or the NFC module 228 may be included in a single integrated chip (IC) or IC package. The RF module 229 may transmit and receive, for example, communication signals (for example, RF signals). The RF module 229 may include, for example, a transceiver, a power amplifier module (PAM), a frequency filter, a low noise amplifier (LNA), an antenna, or the like. According to another embodiment, at least one of the cellular module 221, the Wi-Fi module 223, the BT module 225, the GNSS module 227, or the NFC module 228 may transmit and receive RF signals via a separate RF module. The SIM 224 may include, for example, a card including the SIM and/or an embedded SIM. The SIM 224 may include a unique identifier (for example, integrated circuit card identifier (ICCID)) or subscriber information (for example, international mobile subscriber identity (IMSI)).

The memory 230 (for example, the memory 130) may include, for example, an internal memory 232 or an external memory 234. The internal memory 232 may be at least one of, for example, a volatile memory (for example, dynamic random-access memory (DRAM), static RAM (SRAM), or synchronous DRAM (SDRAM)), and a non-volatile memory (for example, one time programmable read-only memory (ROM) (OTPROM), programmable ROM (PROM), erasable and programmable ROM (EPROM), electrically erasable and programmable ROM (EEPROM), mask ROM, flash ROM, flash memory, a hard drive, or a solid-state drive (SSD)). The external memory 234 may include a flash drive such as a compact flash (CF) drive, a secure digital (SD), a micro secure digital (micro-SD), a mini secure digital (mini-SD), an extreme digital (xD), a multi-media card (MMC), or a memory stick. The external memory 234 may be operatively or physically coupled to the electronic device 201 via various interfaces.

The sensor module 240 may, for example, measure physical quantities or detect operational states of the electronic device 201, and convert the measured or detected information into electric signals. The sensor module 240 may include at least one of, for example, a gesture sensor 240A, a gyro sensor 240B, an atmospheric pressure sensor 240C, a magnetic sensor 240D, an accelerometer sensor 240E, a grip sensor 240F, a proximity sensor 240G, a color sensor (for example, a red, green, blue (RGB) sensor) 240H, a biometric sensor 240I, a temperature/humidity sensor 240J, an illumination sensor 240K, or an ultra violet (UV) sensor 240M. Additionally or alternatively, the sensor module 240 may include, for example, an electrical-nose (E-nose) sensor, an electromyogram (EMG) sensor, an electroencephalogram (EEG) sensor, an electrocardiogram (ECG) sensor, an infrared (IR) sensor, an iris sensor, and/or a finger print sensor. The sensor module 240 may further include a control circuit for controlling one or more sensors included therein. According to some embodiments, the electronic device 201 may further include a processor configured to control the sensor module 240, as a part of or separately from the processor 210. Thus, while the processor 210 is in a sleep state, the control circuit may control the sensor module 240.

The input device 250 may include, for example, a touch panel 252, a (digital) pen sensor 254, a key 256, or an ultrasonic input device 258. The touch panel 252 may operate in at least one of, for example, capacitive, resistive, infrared (IR), and ultrasonic schemes. The touch panel 252 may further include a control circuit. The touch panel 252 may further include a tactile layer to thereby provide haptic feedback to the user. The (digital) pen sensor 254 may include, for example, a detection sheet which is a part of the touch panel or separately configured from the touch panel. The key 256 may include, for example, a physical button, an optical key, or a keypad. The ultrasonic input device 258 may sense ultrasonic signals generated by an input tool using a microphone (for example, a microphone 288), and identify data corresponding to the sensed ultrasonic signals.

The display 260 (for example, the display 160) may include a panel 262, a hologram device 264, a projector 266, and/or a control circuit for controlling them. The panel 262 may be configured to be, for example, flexible, transparent, or wearable. The panel 262 and the touch panel 252 may be implemented as one or more modules. According to an embodiment, the panel 262 may include a pressure sensor (or a force sensor) for measuring the strength of the pressure of a user touch. The pressure sensor may be integrated with the touch panel 252, or configured as one or more sensors separately from the touch panel 252. The hologram device 264 may utilize the interference of light waves to provide a three-dimensional (3D) image in empty space. The projector 266 may display an image by projecting light on a screen. The screen may be positioned, for example, inside or outside the electronic device 201. The interface 270 may include, for example, an HDMI 272, a USB 274, an optical interface 276, or a D-subminiature (D-sub) 278. The interface 270 may be included, for example, in the communication interface 170 illustrated in FIG. 1. Additionally or alternatively, the interface 270 may include, for example, a mobile high-definition link (MHL) interface, an SD/multimedia card (MMC) interface, or an infrared data association (IrDA) interface.

The audio module 280 may, for example, convert a sound to an electrical signal, and vice versa. At least a part of the components of the audio module 280 may be included, for example, in the I/O interface 150 illustrated in FIG. 1. The audio module 280 may process sound information input into, or output from, for example, a speaker 282, a receiver 284, an earphone 286, or the microphone 288. The camera module 291 may capture, for example, still images and a video. According to an embodiment, the camera module 291 may include one or more image sensors (for example, a front sensor or a rear sensor), a lens, an image signal processor (ISP), or a flash (for example, an LED or a xenon lamp). The power management module 295 may manage power of, for example, the electronic device 201. According to an embodiment, the power management module 295 may include a power management integrated circuit (PMIC), a charger IC, or a battery or fuel gauge. The PMIC may adopt wired and/or wireless charging. The wireless charging may be performed, for example, in a magnetic resonance scheme, a magnetic induction scheme, or an electromagnetic wave scheme, and may further include an additional circuit for wireless charging, for example, a coil loop, a resonance circuit, or a rectifier. The battery gauge may measure, for example, a charge level, a voltage while charging, current, or temperature of the battery 296. The battery 296 may include, for example, a rechargeable battery and/or a solar battery. The indicator 297 may indicate specific states of the electronic device 201 or a part of the electronic device 201 (for example, the processor 210), for example, boot status, message status, or charge status. The electronic device 201 may include, for example, a mobile TV support device (for example, a GPU) for processing media data compliant with, for example, digital multimedia broadcasting (DMB), digital video broadcasting (DVB), or MediaFLO™. Each of the above-described components of the electronic device may include one or more parts and the name of the component may vary with the type of the electronic device. According to various embodiments, some component may be omitted from or added to the electronic device (for example, the electronic device 201). Or one entity may be configured by combining a part of the components of the electronic device, to thereby perform the same functions of the components prior to the combining.

Figure 3:
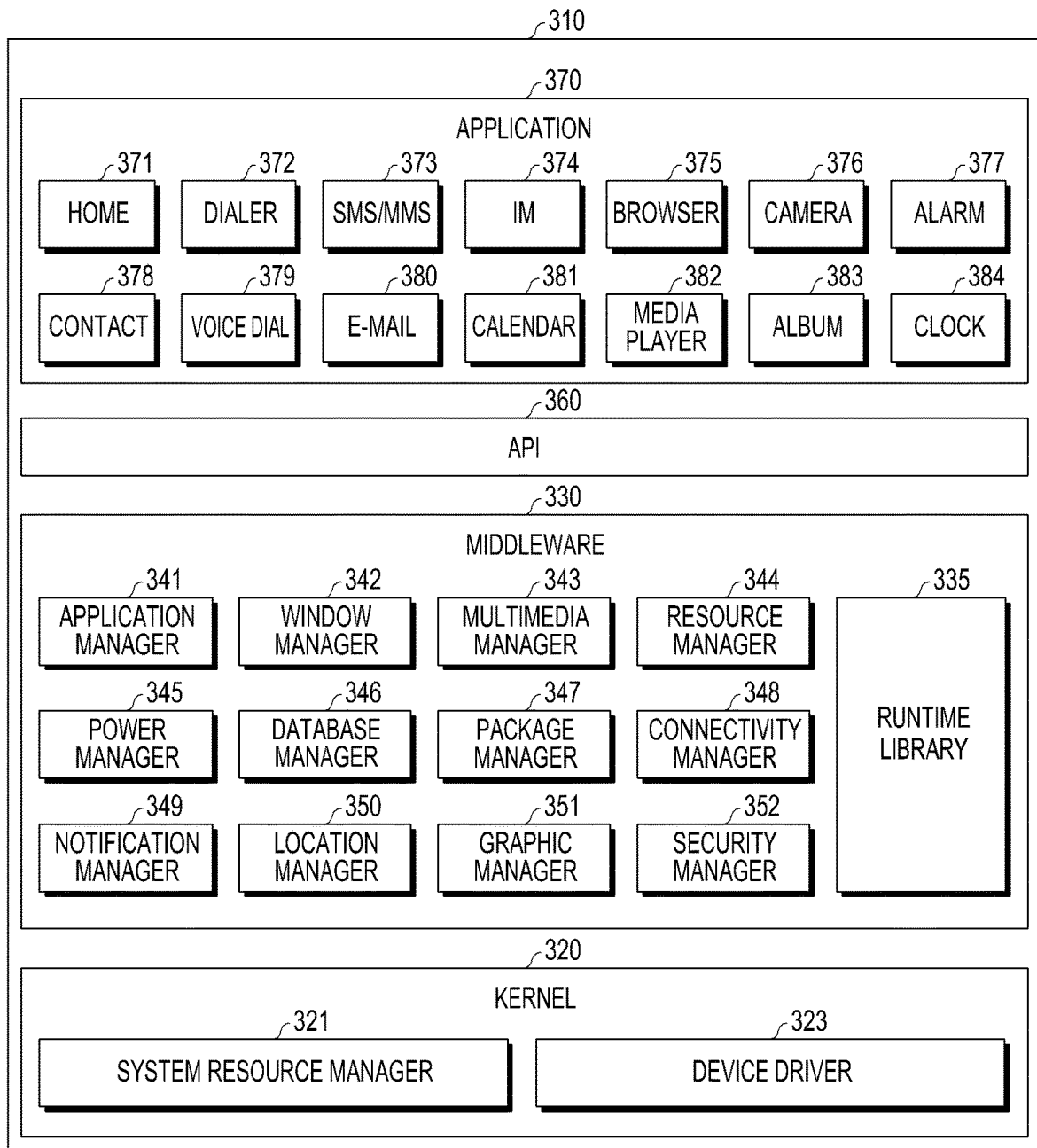
FIG. 3 is a block diagram of a programming module according to various embodiments of the present disclosure.

FIG. 3 is a block diagram of a programming module according to various embodiments of the present disclosure. According to an embodiment, a programming module 310 (for example, a program 140) may include an OS that controls resources related to an electronic device (for example, the electronic device 101) and/or various applications executed on the OS (for example, the application programs 147). For example, the OS may be Android™, iOS™, Windows™, Symbian™, Tizen™, or Bada™.

Referring to FIG. 3, the programming module 310 may include a kernel 320 (for example, the kernel 141), middleware 330 (for example, the middleware 143), an application programming interface (API) 360 (for example, the API 145), and/or applications 370 (for example, the application programs 147). At least a part of the programming module 310 may be preloaded on the electronic device or downloaded from an external electronic device (for example, the electronic device 102 or 104, or the server 106).

The kernel 320 may include, for example, a system resource manager 321 and/or a device driver 323. The system resource manager 321 may control, allocate, or deallocate system resources. According to an embodiment, the system resource manager 321 may include a process manager, a memory manager, or a file system manager. The device driver 323 may include, for example, a display driver, a camera driver, a BT driver, a shared memory driver, a USB driver, a keypad driver, a Wi-Fi driver, an audio driver, or an inter-process communication (IPC) driver. The middleware 330 may, for example, provide a function required commonly for the applications 370 or provide various functionalities to the applications 370 through the API 360 so that the applications 370 may use limited system resources available within the electronic device. According to an embodiment, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include, for example, a library module that a complier uses to add a new function in a programming language during execution of an application 370. The runtime library 335 may perform input/output (I/O) management, memory management, or arithmetic function processing. The application manager 341 may manage, for example, the life cycle of the applications 370. The window manager 342 may manage graphic user interface (GUI) resources used for a screen. The multimedia manager 343 may determine formats required to play back media files and may encode or decode a media file using a device or computer program for encoding or decoding a digital data stream or signal (CODEC) suitable for the format of the media file. The resource manager 344 may manage a source code or a memory space. The power manager 345 may, for example, manage a battery capacity, temperature, or a power source and provide power information required for an operation of the electronic device, using corresponding information. According to an embodiment, the power manager 345 may interact with a basic I/O system (BIOS). The database manager 346 may, for example, generate, search, or modify a database to be used for the applications 370. The package manager 347 may manage installation or update of an application distributed as a package file.

The connectivity manager 348 may manage, for example, wireless connectivity. The notification manager 349 may provide a user with an event such as message arrival, a schedule, a proximity notification, or the like. The location manager 350 may, for example, mange position information about the electronic device. The graphic manager 351 may, for example, manage graphical effects to be provided to the user or related user interfaces. The security manager 352 may, for example, provide system security or user authentication. In an embodiment, the middleware 330 may include a telephony manager to manage a voice or video call function of the electronic device, or a middleware module for combining functions of the above-described components. According to an embodiment, the middleware 330 may provide a customized module for each OS type. The middleware 330 may dynamically delete a part of the existing components or add a new component. The API 360 is, for example, a set of API programming functions, which may be configured differently according to an OS. For example, in the case of Android or iOS, one API set may be provided per platform, whereas in the case of Tizen, two or more API sets may be provided per platform.

The applications 370 may include home 371, dialer 372, short message service/multimedia messaging service (SMS/MMS) 373, instant message (IM) 374, browser 375, camera 376, alarm 377, contacts 378, voice dial 379, email 380, calendar 381, media player 382, album 383, watch/clock 384, health care (for example, measurement of an exercise amount or a glucose level), or an application for providing environment information (for example, information about atmospheric pressure, humidity, or temperature). According to an embodiment, the applications 370 may include an information exchange application capable of supporting information exchange between the electronic device and an external electronic device. The information exchange application may include, for example, a notification relay application for transmitting specific information to the external electronic device or a device management application for managing the external electronic device. For example, the notification relay application may transmit notification information generated from another application to the external electronic device, or receive notification information from the external electronic device and transmit the received notification information to a user. The device management application may, for example, install, delete, or update functions of the external electronic device communicating with the electronic device (for example, turn-on/turn-off of the external electronic device (or a part of its components) or control of the brightness (or resolution) of the display), or an application executed in the external electronic device. According to an embodiment, the applications 370 may include (an application (for example, a health care application of a mobile medical equipment) designated according to a property of the external electronic device. According to an embodiment, the applications 370 may include an application received from an external electronic device. At least a part of the programming module 310 may be realized (for example, implemented) in software, firmware, hardware (for example, the processor 210), or a combination of at least two of them, and may include a module, a program, a routine, a set of instructions, or a process to execute one or more functions.

Figure 4:
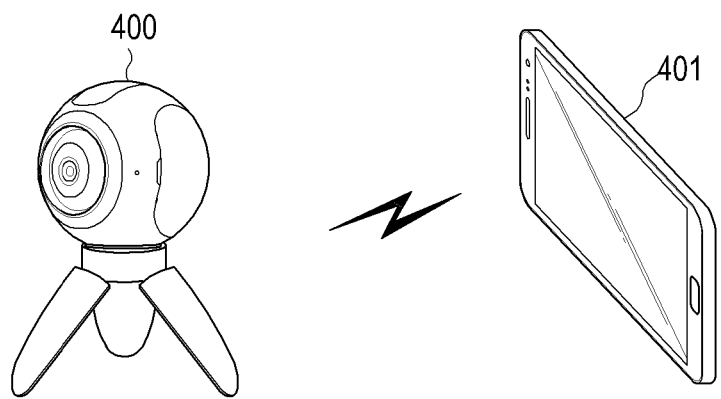
FIG. 4 is a view illustrating a capturing device and an electronic device according to various embodiments of the present disclosure.

FIG. 4 is a view illustrating a capturing device and an electronic device according to various embodiments of the present disclosure.

Referring to FIG. 4, a capturing device 400 may capture a 360-degree omni-directional image, and an electronic device 401 may display the 360-degree omni-directional image.

The capturing device 400 may capture an image omni-directionally at 360 degrees with respect to a fixed view. Herein, a 360-degree image (hereinafter, also referred to as an 'omni-directional image') is an image including all of views captured by a photographer (or capturing device) during rotation at the point of the photographer (or capturing device), and views captured by the photographer (or capturing device) while the photographer lowers or raises his or her head. To capture an omni-directional image, the capturing device 400 may include one or more lenses, or one or more cameras.

According to an embodiment, the capturing device 400 may include a fish-eye lens. The fish-eye lens may have a 180 or more-degree angle of view. That is, if the fish-eye lens is directed toward the sky, the fish-eye lens may capture areas from constellations on the sky to the horizon in one image. The capturing device 400 may include a plurality of fish-eye lenses and capture an omni-directional image using the plurality of fish-eye lenses. According to another embodiment, the capturing device 400 may include a plurality of cameras each having a specific angle of view and capture an omni-directional image using the plurality of cameras. In this case, the plurality of cameras may be provided in the capturing device 400 in order to cover all directions with respect to one center point. According to another embodiment, the capturing device 400 may include one or more cameras and capture images in all directions by making a motion (in directions of pitch, yaw, roll, and so on) automatically and/or manually. According to another embodiment, the capturing device 400 may include a plurality of cameras each having a predetermined angle of view in correspondence with the left and right eyes of a user. In this case, the capturing device 400 may capture a stereoscopic image including a plurality of omni-directional images. According to various embodiments, the capturing device 400 may not be limited to the above-described examples.

The capturing device 400 may record captured images and related metadata in association with each other. According to various embodiments, the metadata may include information about cameras (or lenses) included in the capturing device 400, information about capturing directions of the cameras, information about capturing ranges of the cameras, information about an area of an omni-directional image, corresponding to an image captured by each of the cameras, information about a position at which an image is captured, and so on. According to various embodiments, the metadata may be generated by associating at least one of position information, motion information, and direction information sensed by sensors with at least one piece of camera characteristic information. The camera characteristic information may include a camera calibration parameter and capturing state information. According to various embodiments, the capturing device 400 may include at least one sensor, for example, at least one of a GPS sensor, a Wi-Fi fingerprint sensor, a gyro sensor, an accelerometer sensor, a geomagnetic sensor, and an altitude sensor. The capturing device 400 may further include other sensors.

According to an embodiment, the capturing device 400 may record a captured image and related metadata by associating them with each other, and the metadata may include sensing information sensed by a sensor during image capturing, mapped to (associated with) identification information about each frame of the image. According to an embodiment, the capturing device 400 may record sensing information acquired during capturing of each frame of an image in association with the frame. According to various embodiments, sensing information associated with an image may include at least one of information about a position of the capturing device 400, information about a capturing direction of at least one camera of the capturing device 400, and information about a motion (or movement) of the capturing device 400.

The capturing device 400 may map a captured omni-directional image onto the surface of a 3D model, for example, a sphere, a cube, or a cylinder, encode the mapped 360-degree image, and store the encoded image in a memory or transmit the encoded image to the electronic device 401.

According to an embodiment, when the capturing device 400 maps an omni-directional image to a 3D model space, information about characteristics of one or more virtual cameras (or virtual lenses) corresponding to one or more cameras (or lenses) included in the capturing device 400 may be stored in association with the mapped 360-degree image. According to various embodiments, the information about characteristics of a virtual camera may include information about the position, capturing direction, angle of view, and capturing range of the virtual camera, and so on. According to various embodiments, a part of a 360-degree image may be an image captured in correspondence with the field of view (FOV) of a virtual camera.

The electronic device 401, which is an image reproduction device, may be a device capable of rendering an image. The electronic device 401 may be any of various electronic devices which process an image, such as a virtual reality (VR) device like an HMD, a smartphone, a PC, a TV, and a tablet PC. The electronic device 401 may decode a 360-degree image stored in a memory, or may receive a 360-degree image mapped to a 3D model space from the capturing device 400 and decode the received 360-degree image. The electronic device 401 may be provided with a communication module such as a Wi-Fi module, a BT module, or a Zigbee module and communicate with the capturing device 400, for the case where the electronic device 401 receives a bit stream from the capturing device 400.

The electronic device 401 may convert the decoded 360-degree image to a two-dimensional (2D) planar image, render the converted 2D planar image, and display the rendered frame. The electronic device 401 may be a device capable of executing a 3D application, such as a smartphone. The electronic device 401 may store a 3D application (or VR application) and a 3D graphic library. The 3D application may be an application capable of a screen similar to a real world to a user. In an embodiment, VR may refer to a virtual space in which the surroundings around a user (origin or camera) may be viewed. For example, VR may be a virtual space representing 360 degrees such as a 360-degree video, 360-degree image content, or a 3D graphic modeling space, rendered on a screen. The electronic device 401 may be a wearable device such as an HMD. As a user wears the electronic device 401, the user may view an image displayed on a display of the electronic device 401 or an image received from the capturing device 400.

According to an embodiment, the capturing device 400 and the electronic device 401 may be integrated into one electronic device.

Figure 5:
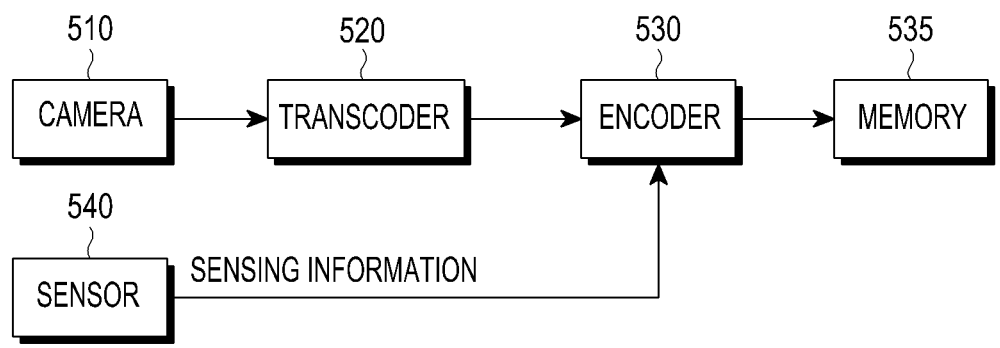
FIG. 5 is a block diagram of a capturing device according to various embodiments of the present disclosure.

FIG. 5 is a block diagram illustrating a configuration of the capturing device 400 according to various embodiments of the present disclosure.

Referring to FIG. 5, the capturing device 400 may include a camera 510, a transcoder 520, an encoder 530, a memory 535, and a sensor 540.

The camera 510 may capture an omni-directional image. For example, on the assumption that the camera 510 is provided with a pair of fish-eye lenses each having an angle of view of 180 or more degrees, the camera 510 may capture an omni-directional image, using the pair of fish-eye lenses. The camera 510 may transmit two images captured by the pair of fish-eye lenses to the transcoder 520. In another example, if there are a plurality of cameras 510, the cameras 510 may capture spaces in different directions. In this case, the plurality of cameras 510 may transmit a plurality of images captured in the different directions to the transcoder 520.

The transcoder 520 may map an omni-directional image to a 3D image. For example, the transcoder 520 may map the two images captured by the fish-eye lenses to a 360-degree image or the plurality of images captured by the plurality of cameras to a 360-degree image. According to an embodiment, to map an omni-directional image to a 360-degree image, the transcoder 520 may map the omni-directional image to the outer or inner surface of a virtual 3D model. According to an embodiment, the transcoder 520 may map an omni-directional image to a 2D image. Simultaneously with mapping of the 360-degree image to the 2D image, the transcoder 520 may generate metadata about a coordinate relationship between the mapped 360-degree image and the mapped 2D image.

The encoder 530 may encode the 360-degree image received from the transcoder 520. For example, the encoder 530 may encode the 360-degree image in compliance with a codec standard such as H.264, MPEG-4, or high efficiency video coding (HEVC). Herein, the encoder 530 may store the encoded image data of the 360-degree image in the form of a video or still images in the memory 535. Further, the encoder 530 may transmit the encoded image data as streaming data or a file to the electronic device 401.

The sensor 540 may sense at least one of position information, motion information, and direction information and provide sensing information. For example, the sensor 540 may include at least one of a GPS sensor, a Wi-Fi fingerprint sensor, a gyro sensor, an accelerometer sensor, a geomagnetic sensor, and an altitude sensor. The sensor 540 may further include other sensors. According to various embodiments, if a plurality of cameras exist, a plurality of sensors associated with the respective cameras may be included. Each of the sensors associated with the respective cameras may sense at least one of position information, motion information, and direction information about a camera associated with the sensor.

Metadata may be generated using at least one of sensing information and camera characteristic information. The camera characteristic information may include a camera calibration parameter and capturing state information. The sensing information may include at least one of position information, motion information, and direction information. According to various embodiments, metadata may include information about the positions and number of cameras (or lenses) included in the capturing device 400, information about capturing directions of the cameras, information about capturing ranges of the cameras, information about an area of an omni-directional image, corresponding to an image captured by each of the cameras, and information about a position at which an image has been captured.

Sensing information associated with an image is stored in the memory 535. The sensing information associated with the image may be stored such that sensing information acquired during capturing of each frame of the image may be stored for each frame. Further, the sensing information associated with the image may be included in metadata about the image, along with identification information about each frame of the image.

Metadata may be stored along with encoded image data in the memory 535, or transmitted along with the encoded image data, as streaming data or a file. According to various embodiments, metadata may be generated as a separate document (for example, an omnidirectional media application format (OMAF) document) and stored in association with encoded image data or transmitted in association with the encoded image data, upon request for the image data. For example, the metadata may be associated with the encoded image data, and thus may be invoked automatically together with the encoded image data. Upon request for the encoded image data, the metadata may be transmitted together with or separately from the encoded image data, or the metadata may be transmitted to a specific device or module, irrespective of the request for the encoded image data.

Figure 6A:
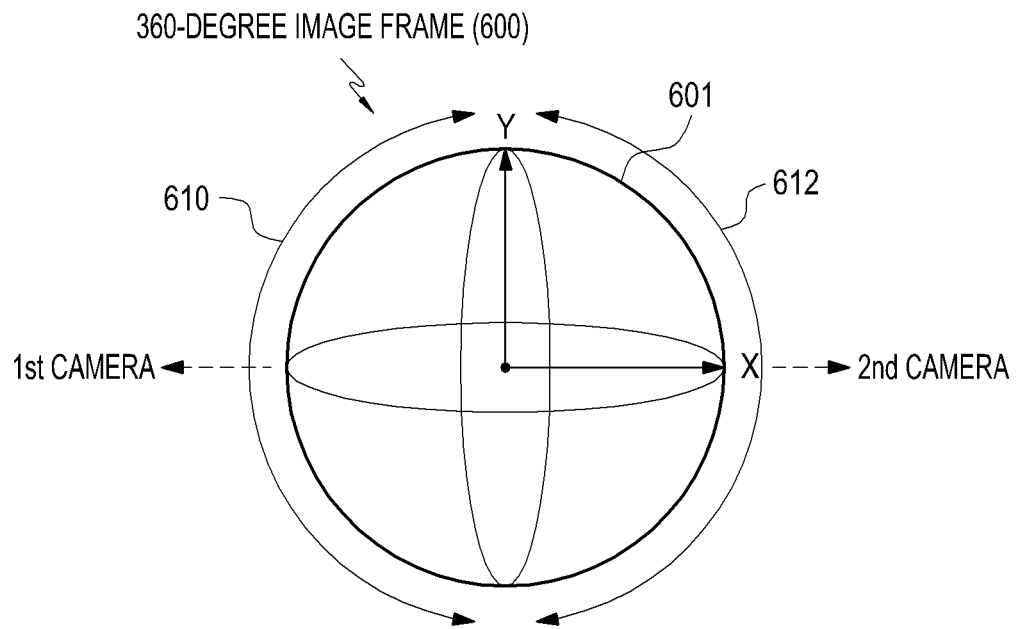
FIGS. 6A, 6B and 6C are conceptual views of a 360-degree image frame according to various embodiments of the present disclosure.
Figure 6B:
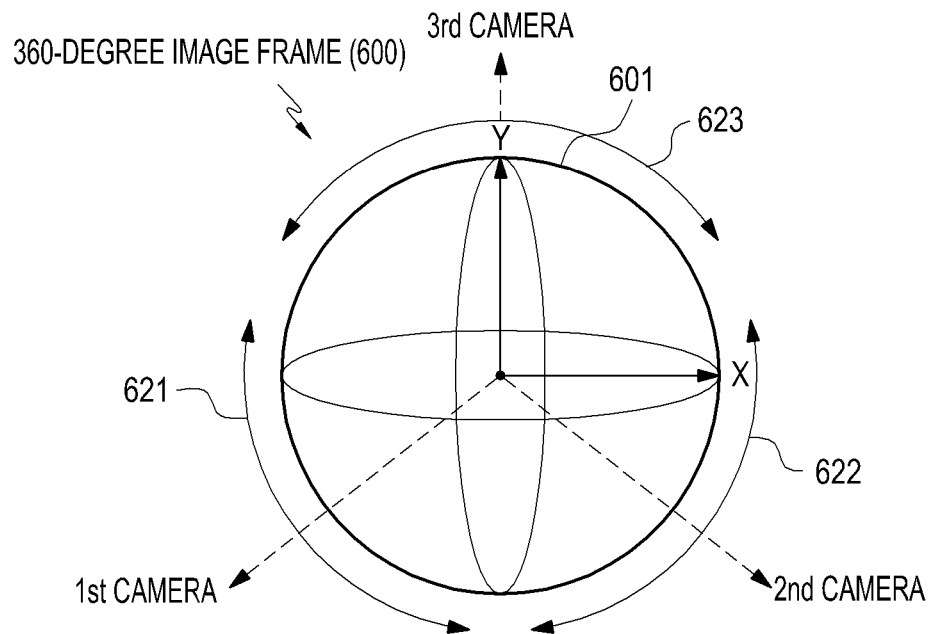
Figure 6C:
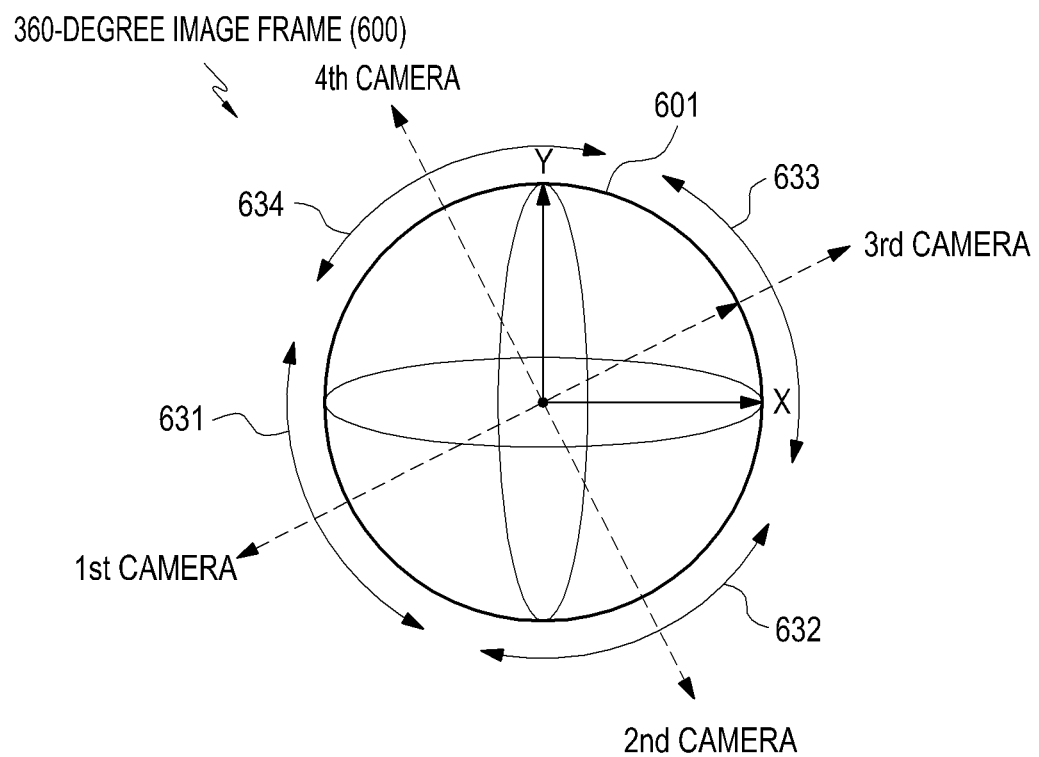

FIGS. 6A, 6B and 6C are conceptual views of a 360-degree image according to various embodiments of the present disclosure.

Referring to FIG. 6A, if there are two cameras 510, a 360-degree image 600 may be an image obtained by mapping a first image 610 captured by a first camera and a second image 612 captured by a second camera onto the surface of a 3D model 601 (for example, a 3D model in the form of a sphere).

Referring to FIG. 6B, if there are three cameras 510, the 360-degree image 600 may be an image obtained by mapping a first image 621 captured by a first camera, a second image 622 captured by a second camera, and a third image 623 captured by a third camera onto the surface of the 3D model 601 (for example, a 3D model in the form of a sphere).

Referring to FIG. 6C, if there are four cameras 510, the 360-degree image 600 may be an image obtained by mapping a first image 631 captured by a first camera, a second image 632 captured by a second camera, a third image 633 captured by a third camera, and a fourth image 634 captured by a fourth camera onto the surface of the 3D model 601 (for example, a 3D model in the form of a sphere).

According to various embodiments, the 3D model 601 may be shaped into any of a cube, a cylinder, and so on other than a sphere.

According to various embodiments, when the first to fourth images 631 to 634 are mapped onto the 3D model 601, the first to fourth images 631 to 634 may be overlapped partially in the image mapped on the 3D model 601. According to an embodiment, overlap areas may be eliminated by the transcoder 520.

According to various embodiments, an electronic device may include a display and a processor operatively connected to the display. The processor may be configured to acquire 360-degree image data and metadata corresponding to the 360-degree image data, and to display an object including a first indicator and a second indicator on the display, using the metadata, the first indicator indicating an angle of view or capturing direction x (e.g., x-direction) along a horizontal direction in a 3D model space (or referred to horizontal capturing direction in the 3D model space, or capturing direction on x-axis plane of the 3D model space) for a first area of the 360-degree image data, and the second indicator indicating an angle of view or capturing direction y (e.g., y-direction) along a vertical direction in the 3D model space (or referred to vertical capturing direction in the 3D model space, or capturing direction on y-axis plane of the 3D model space).

According to an embodiment, the processor may be configured to generate the object further including a third indicator providing information about at least one camera used to acquire the 360-degree image data.

According to an embodiment, the processor may be configured to generate the object further including a fourth indicator indicating whether the first area has been zoomed in or zoomed out.

According to an embodiment, upon receipt of an input for changing the horizontal direction through the first indicator on the object, the processor may be configured to display an image of a second area corresponding to the changed horizontal direction on the display according to the input.

According to an embodiment, upon receipt of an input for changing the vertical direction through the second indicator on the object, the processor may be configured to display an image of a third area corresponding to the changed vertical direction on the display according to the input.

According to an embodiment, upon selection of a virtual camera included in the information about the at least one camera by means of the third indicator on the object, the processor may be configured to display an image of a fourth area according to the selected virtual camera on the display.

According to an embodiment, upon receipt of a zoom-in command or a zoom-out command for the first area through the fourth indicator on the object, the processor may be configured to display the image of the first area zoomed-in or zoomed-out according to the zoom-in command or the zoom-out command on the display.

According to an embodiment, the information about the at least one camera may include information indicating the number and position of the at least one camera.

According to an embodiment, the number of the at least one camera may be indicated by a numeral.

Figure 7:
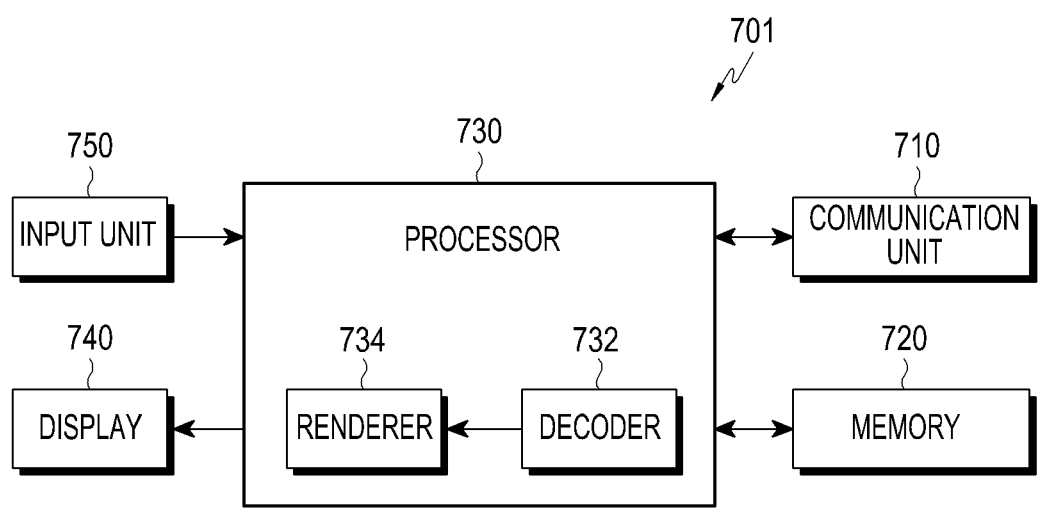
FIG. 7 is a block diagram of an electronic device according to various embodiments of the present disclosure.

FIG. 7 is a block diagram of an electronic device according to various embodiments of the present disclosure.

Referring to FIG. 7, an electronic device 701 may include a communication unit 710 (e.g., a transceiver), a memory 720, a processor 730 (e.g., at least one processor), a display 740, and an input unit 750 (e.g., an input device).

The communication unit 710 may receive 360-degree image data. The memory 720 may store the 360-degree image data.

The processor 730 may provide overall control to the electronic device 701. The processor 730 may include a decoder 732 and a renderer 734.

The decoder 732 may decode received or stored 360-degree data. The decoder 732 may decode the 360-degree image data in conformance to the same codec standard (for example, H.264, MPEG-4, or HEVC) as used for encoding of the 360-degree image data.

The renderer 734 may receive the decoded 360-degree image data in a predetermined unit of video frames, and perform rendering based on the received video frames. According to an embodiment, the renderer 734 may additionally use metadata for the rendering. The metadata may be received along with the 360-degree image data, or may have been stored along with the 360-degree image data. According to an embodiment, if the 360-degree image data is encoded in JPEG, the metadata may be included in an exif field of joint photographic experts group (JPEG). If the 360-degree image data is compressed in MPEG-4 in the transmitter, the metadata may be included in a moov field of MPEG-4. In another embodiment, the metadata may be included at the end of a video frame.

The processor 730 may acquire 360-degree image data and metadata corresponding to the 360-degree image data from the communication unit 710 or the memory 720. The processor 730 may decode the 360-degree image data to a 360-degree video frame using the decoder 732, and output a predetermined area (hereinafter, referred to as a 'first area') of the decoded 360-degree video frame. The processor 730 may acquire information about at least one camera used to acquire the 360-degree image data, using the metadata, and map the information about the at least one camera to a 3D model space. According to an embodiment, the processor 730 may determine horizontal and vertical directions in the 3D model space for the first area, using the metadata, and generate an object representing the position of the camera, and the horizontal and vertical directions in the 3D model space for the first area. According to various embodiments, the object may be a map view schematizing horizontal and vertical axes, and the positions and number of cameras in the 3D model space. The following description will be given in the context of the object being a map view, by way of example. However, it is obvious that the object may take any other form than the above-described map view.

The processor 730 may render the first area and the generated map view through the renderer 734.

The display 740 may display the rendered image of the first area and the rendered map view.

The input unit 750 may be included as a touch screen in the display 740. The input unit 750 may receive, for example, a touch input, a gesture input, a proximity input, or a hovering input through an electronic pen or a user's body part. The input unit 750 may be included as a touch screen in the display 740. According to various embodiments, the input unit 750 may receive a touch input, a gesture input, a proximity input, or a hovering input generated on the map view displayed on the display 740, and provide the received input to the processor 730.

The processor 730 may determine whether an input for selecting at least one of the horizontal and vertical directions has been applied to the map view, a camera selection input has been applied to the map view, or a zoom-in or zoom-out request has been issued on the map view, according to the touch input, gesture input, proximity input, or hovering input generated on the map view.

According to an embodiment, upon receipt of an input for selecting one of the horizontal and vertical directions in the map view, the processor 730 may control output of an image of a second area corresponding to the selected direction of 360-degree image data from the decoder 732. According to an embodiment, upon receipt of an input for selecting a virtual camera in the map view, the processor 730 may control output of an image of a third area corresponding to the selected camera of the 360-degree image data from the decoder 732. Upon receipt of an input for requesting zoom-in or zoom-out in the map view, the processor 730 may zoom in or out a displayed image and control indication of zoom-in or zoom-out on the map view.

Figure 8:
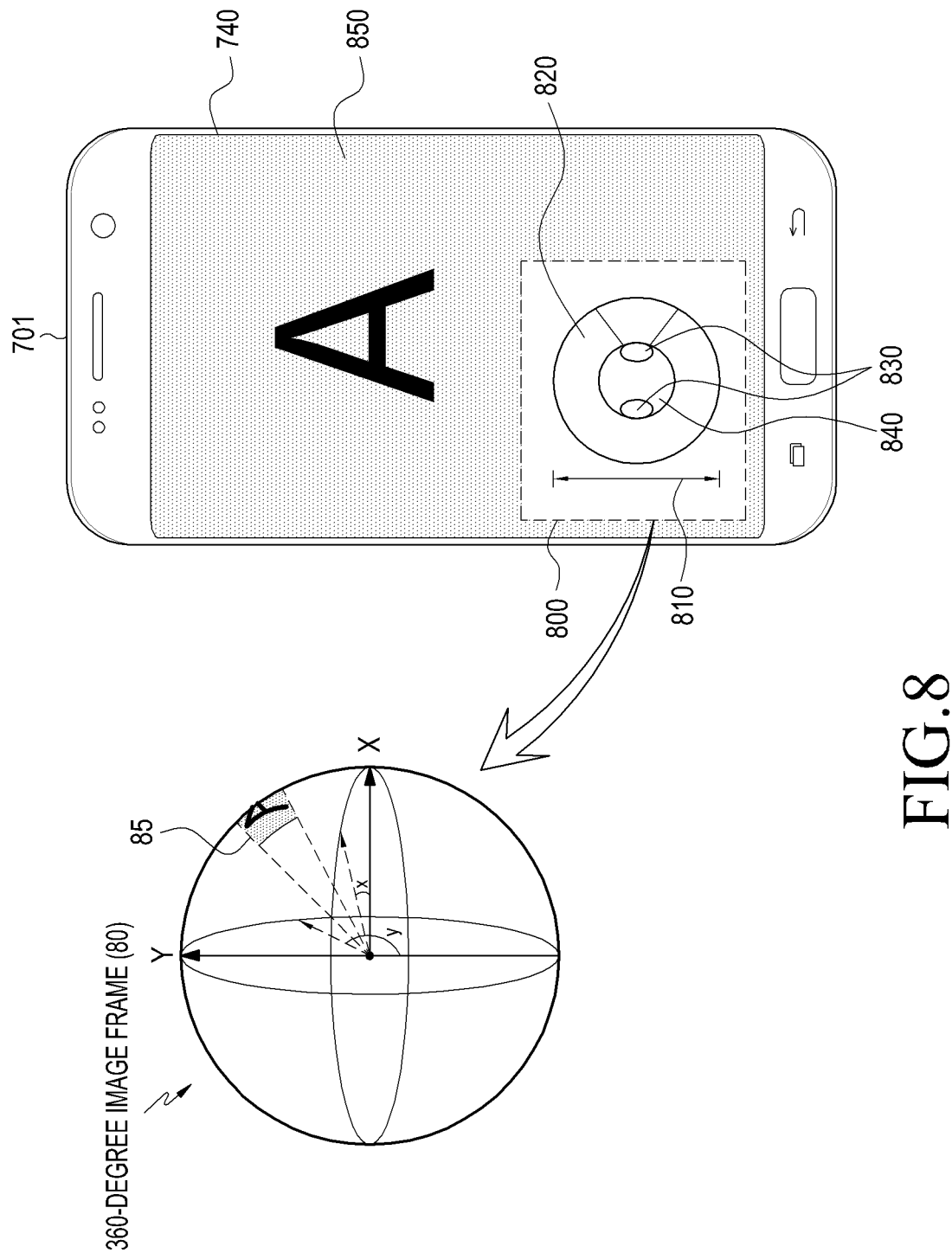
FIG. 8 is a conceptual view of a map view according to various embodiments of the present disclosure.

FIG. 8 is a conceptual view illustrating a map view according to various embodiments of the present disclosure.

Referring to FIG. 8, an electronic device (for example, the electronic device 401 illustrated in FIG. 4 or the electronic device 701 illustrated in FIG. 7) may determine a horizontal direction (for example, an X-axis angle x) and a vertical direction (for example, a Y-axis angle y) in a 3D space for a first area 85 of a 360-degree image frame 80, to be displayed on the display 740, using metadata. According to an embodiment, the X-axis angle and the Y-axis angle may be −180 degrees to +180 degrees and may fall into a 360-degree range. The electronic device 701 may determine information about a camera for the first area 85 (for example, information about a camera used to acquire an image of the first area 85) in the 3D space, using the metadata. The electronic device 701 may generate a map view showing the positions and number of cameras, and horizontal and vertical directions in the 3D model space of the first area 85. The electronic device 701 may render the first area 85 and the map view, and display a rendered image 850 of the first area 85 and a rendered map view 800 on the display 740.

According to various embodiments, the map view 800 may include a second indicator 810 indicating the vertical direction in the 3D model space, a first indicator 820 indicating the horizontal direction in the 3D model space, a third indicator 830 providing information about at least one camera in the 3D model space, and a fourth indicator 840 indicating the zoom-in or zoom-out state of the image.

Figure 9A:
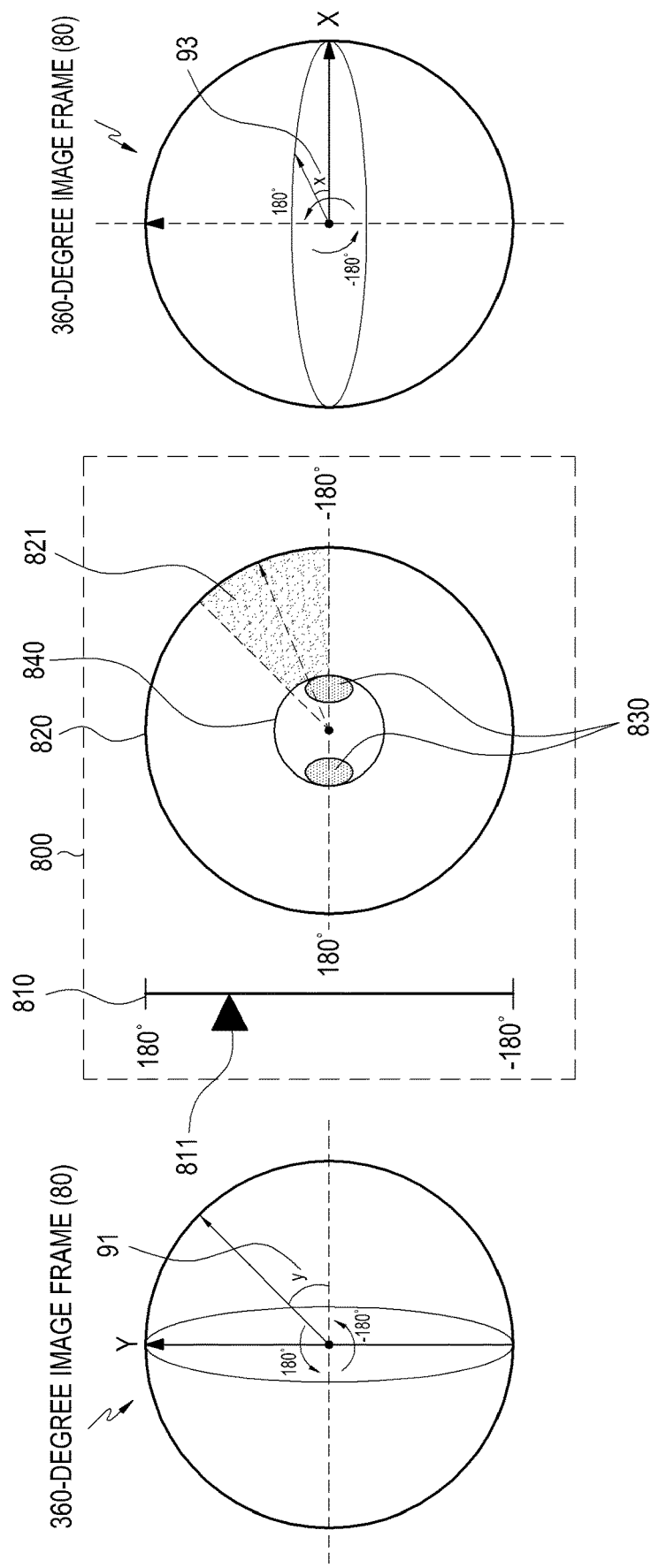
FIGS. 9A, 9B, and 9C are views illustrating configurations of a map view according to various embodiments of the present disclosure.
Figure 9B:
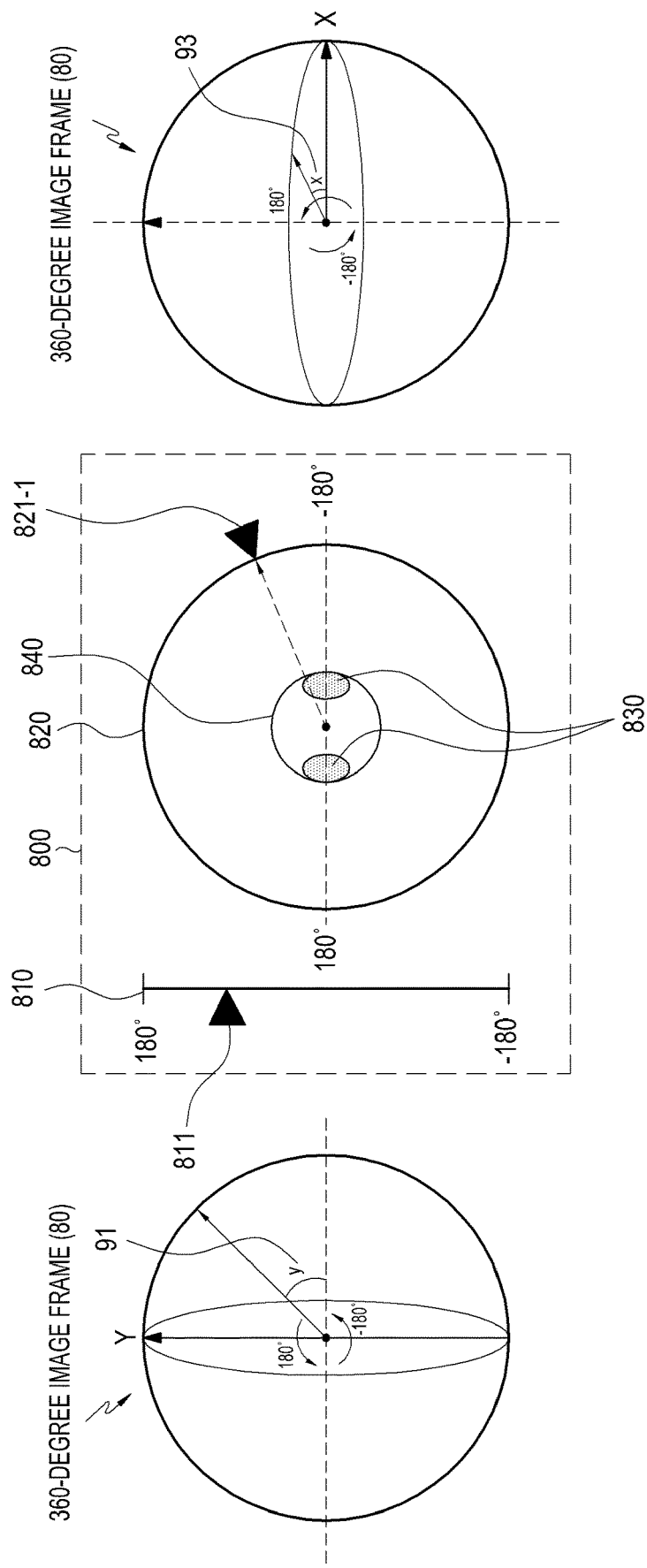
Figure 9C:
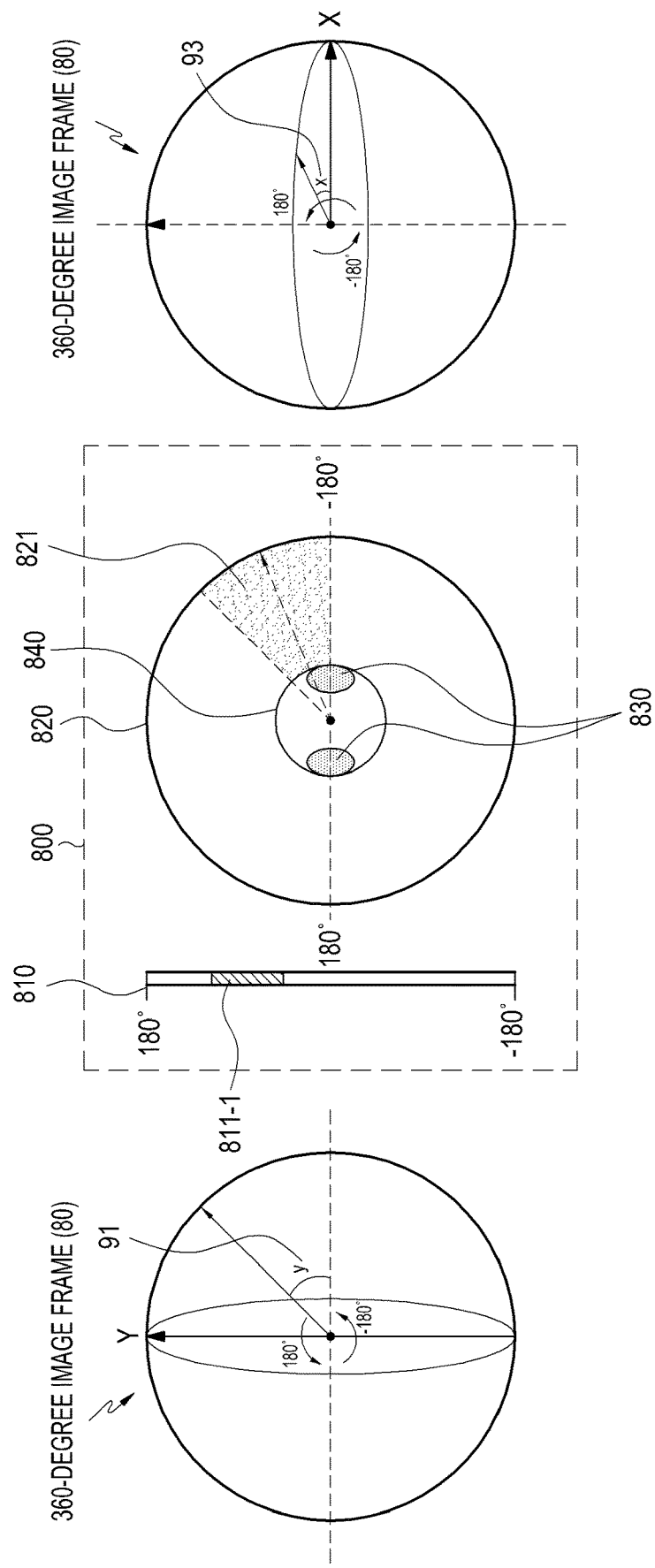

FIGS. 9A, 9B, and 9C are views illustrating configurations of a map view according to various embodiments of present disclosure.

Referring to FIGS. 9A, 9B, and 9C, the second indicator 810 is an indicator indicating an angle of view or capturing direction y along the vertical direction in the 3D space for the first area of the 360-degree image frame 80, to be displayed on the display 740. For example, if the Y-axis angle is y, the second indicator 810 may indicate a point corresponding to y or an area including the point corresponding to y.

The first indicator 820 is an indicator indicating an angle of view or capturing direction x along the horizontal direction for the first area. For example, if the X-axis angle is x, the first indicator 820 may indicate a point corresponding to x or an area including the point corresponding to x. According to various embodiments, each time the X-axis angle and the Y-axis angle are changed, the positions of points or areas indicated by the first and second indicators 820 and 810 or the ways in which the points or areas are displayed by the first and second indicators 820 and 810 may be changed. According to an embodiment, each time the X-axis angle and the Y-axis angle are changed, the colors of points or areas indicated by the first and second indicators 820 and 810 may be changed.

According to various embodiments, an X-axis reference angle and a Y-axis reference angle may be −180 degrees to +180 degrees and may fall within a 360-degree range.

The third indicator 830 is an indicator indicating the number and position of at least one camera used to acquire a 360-degree image frame. For example, if two cameras are used to capture the 360-degree image frame, the third indicator 830 may represent two cameras and indicate the positions of the two cameras.

The fourth indicator 840 is an indicator indicating whether the first area is displayed zoomed-in or zoomed-out. If the first area is displayed zoomed-in, the fourth indicator 840 is displayed enlarged, and if the first area is displayed zoomed-out, the fourth indicator 840 is displayed contracted.

Referring to FIG. 9A, the second indicator 810 may be configured to indicate a point 811 corresponding to a Y-axis angle, y 91, and the first indicator 820 may be configured to indicate an area 821 including a point corresponding to an X-axis angle, x 93. According to various embodiments, if y is 60 degrees and x is 40 degrees, the second indicator 810 may indicate the point 811 corresponding to 60 degrees, and the first indicator 820 may indicate the area 821 corresponding to a range of 20 to 60 degrees including 40 degrees.

Referring to FIG. 9B, the second indicator 810 may be configured to indicate the point 811 corresponding to the Y-axis angle, y 91, and the first indicator 820 may be configured to indicate a point 821-1 corresponding to the X-axis angle, x 93. According to various embodiments, if y is 60 degrees and x is 40 degrees, the second indicator 810 may indicate the point 811 corresponding to 60 degrees, and the first indicator 820 may indicate the point 821-1 corresponding to 40 degrees.

Referring to FIG. 9C, the second indicator 810 may be configured to indicate an area 811-1 including the point corresponding to the Y-axis angle, y 91, and the first indicator 820 may be configured to indicate the area 821 including the point corresponding to the X-axis angle, x 93. According to various embodiments, if y is 60 degrees and x is 40 degrees, the second indicator 810 may indicate the area 811-1 corresponding to a range of 40 to 100 degrees including 60 degrees, and the first indicator 820 may indicate the area 821 corresponding to a range of 20 to 60 degrees including 40 degrees. According to various embodiments, the second indicator 810-1 may be a scroll bar type, and may be configured to change the area 811-1 including the point corresponding to y 91 according to movement of a scroll box on the scroll bar.

With the map view 800 displayed on the display 740, if a user selects each of the first to fourth indicators 810 to 840, a specific input may be executed. According to the user selection and the input, the image 850 of the first area may be switched to an image of another area.

According to various embodiments, a method for displaying a 360-degree image in an electronic device may include acquiring 360-degree image data and metadata corresponding to the 360-degree image data, and displaying an object including a first indicator and a second indicator on a display, using the metadata, the first indicator indicating an angle of view or capturing direction x along a horizontal direction in a 3D model space for a first area of the 360-degree image data, and the second indicator indicating an angle of view or capturing direction y along a vertical direction in the 3D model space.

According to an embodiment, the object may further include, using the metadata, a third indicator providing information about at least one camera used to acquire the 360-degree image data.

According to an embodiment, the object may further include a fourth indicator indicating whether the first area has been zoomed in or zoomed out.

According to an embodiment, upon receipt of an input for changing the horizontal direction through the first indicator on the object, an image of a second area corresponding to the changed horizontal direction may be displayed on the display according to the input.

According to an embodiment, upon receipt of an input for changing the vertical direction through the second indicator on the object, an image of a third area corresponding to the changed vertical direction may be displayed on the display according to the input.

According to an embodiment, upon selection of a virtual camera included in the information about the at least one camera by means of the third indicator on the object, an image of a fourth area according to the selected virtual camera may be displayed on the display.

According to an embodiment, upon receipt of a zoom-in command or a zoom-out command for the first area through the fourth indicator on the object, the image of the first area may be displayed zoomed-in or zoomed-out on the display according to the zoom-in command or the zoom-out command.

According to an embodiment, the information about the at least one camera may include information indicating the number and position of the at least one camera.

According to an embodiment, the number of the at least one camera may be indicated by a numeral.

Figure 10:
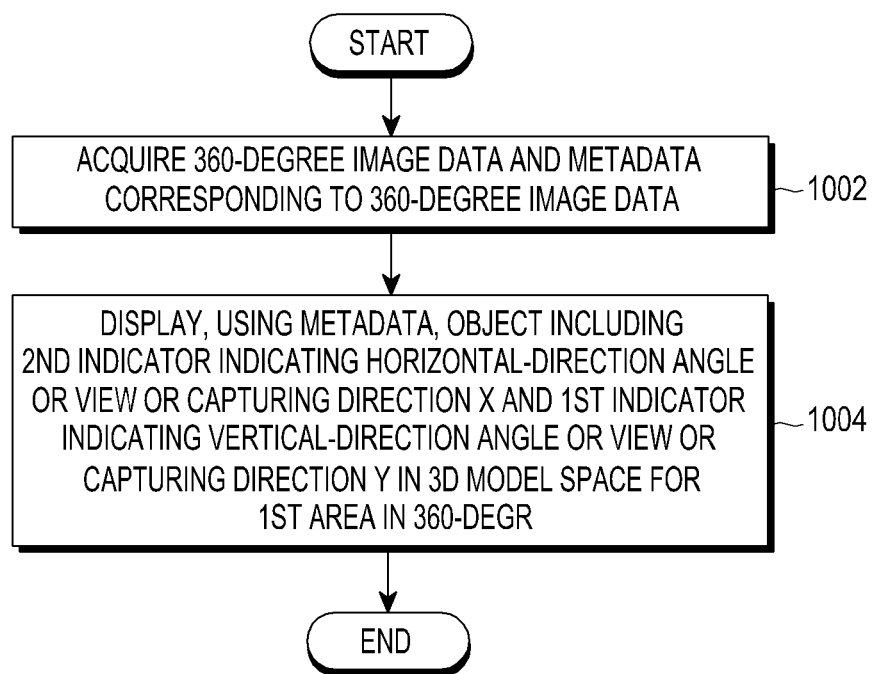
FIG. 10 is a flowchart illustrating an operation for displaying a 360-degree image and a map view in an electronic device according to various embodiments of the present disclosure.

FIG. 10 is a flowchart illustrating an operation for displaying a 360-degree image and a map view in an electronic device according to various embodiments of the present disclosure.

An electronic device according to an embodiment may include a part or whole of the electronic device 101 illustrated in FIG. 1, the electronic device 201 illustrated in FIG. 2, the electronic device 401 illustrated in FIG. 4, or the electronic device 701 illustrated in FIG. 7.

Referring to FIG. 10, the electronic device according to the embodiment may acquire 360-degree image data and metadata corresponding to the 360-degree image data in operation 1002. According to various embodiments, the electronic device may receive 360-degree image data and metadata corresponding to the 360-degree image data through a communication unit (for example, the communication interface 170, the communication module 220, or the communication unit 710), or acquire 360-degree image data and metadata corresponding to the 360-degree image data, which are stored in a memory (for example, the memory 130, 230 or 720).

In operation 1004, the electronic device may display, on a display, a first indicator indicating an angle of view or capturing direction x along a horizontal direction in a 3D model space for a first area of the 360-degree image data and a second indicator indicating an angle of view or capturing direction y along a vertical direction in the 3D model space, using the metadata.

According to an embodiment, a processor (for example, the processor 120, 210, or 730) of the electronic device may decode the 360-degree image data through a decoder (for example, the decoder 730 illustrated in FIG. 7). The decoder may decode the 360-degree image in conformance to the same codec standard (H.264, MPEG-4, or HEVC) as used for encoding of the 360-degree image, and output a predetermined area (hereinafter, referred to a 'first area') of a decoded 360-degree image frame. According to an embodiment, the processor of the electronic device may determine a horizontal-direction angle of view (or capturing direction x) and a vertical-direction angle of view (or capturing direction y) in a 3D model space for the first area, using the metadata, and display, on a display (for example, the display 160, 260 or 740), an object including a first indicator indicating the horizontal-direction angle of view (or capturing direction x) and a second indicator indicating the vertical-direction angle of view (or capturing direction y).

According to an embodiment, the object may further include a third indicator providing information about one or more cameras (for example, the number and positions of cameras in the 3D model space) used to acquire the 360-degree image data, using the metadata. According to an embodiment, the object may further include a fourth indicator indicating whether the first area has been zoomed in or zoomed out.

Figure 11:
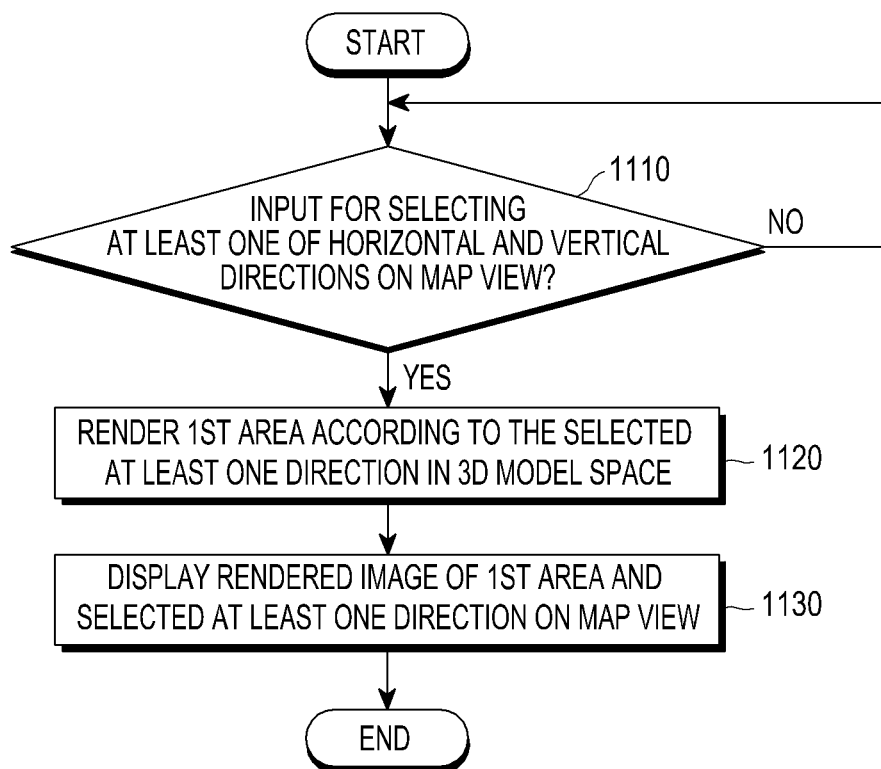
FIG. 11 is a flowchart illustrating an operation performed when at least one of horizontal and vertical directions is selected in a map view according to various embodiments of the present disclosure.

FIG. 11 is a flowchart illustrating an operation which is performed, when at least one of horizontal and vertical directions is selected on a map view according to various embodiments of the present disclosure.

Referring to FIG. 11, the electronic device may determine whether an input for selecting at least one of horizontal and vertical directions on a map view has been received in operation 1110. According to various embodiments, a user may select an intended horizontal direction by means of the second indicator and an intended vertical direction by means of the first indicator on the map view.

Upon receipt of the input for selecting at least one of horizontal and vertical directions, the electronic device may render a first area according to the selected at least one direction in the 3D model space in operation 1120. According to various embodiments, upon receipt of an input for changing a horizontal direction on the map view by means of the first indicator, the electronic device may render an area according to the changed horizontal direction. Further, upon receipt of an input for changing a vertical direction on the map view by means of the second indicator, the electronic device may render an area according to the changed vertical direction.

In operation 1130, the electronic device may display the rendered first area and display the selected at least one direction on the map view.

Figure 12A:
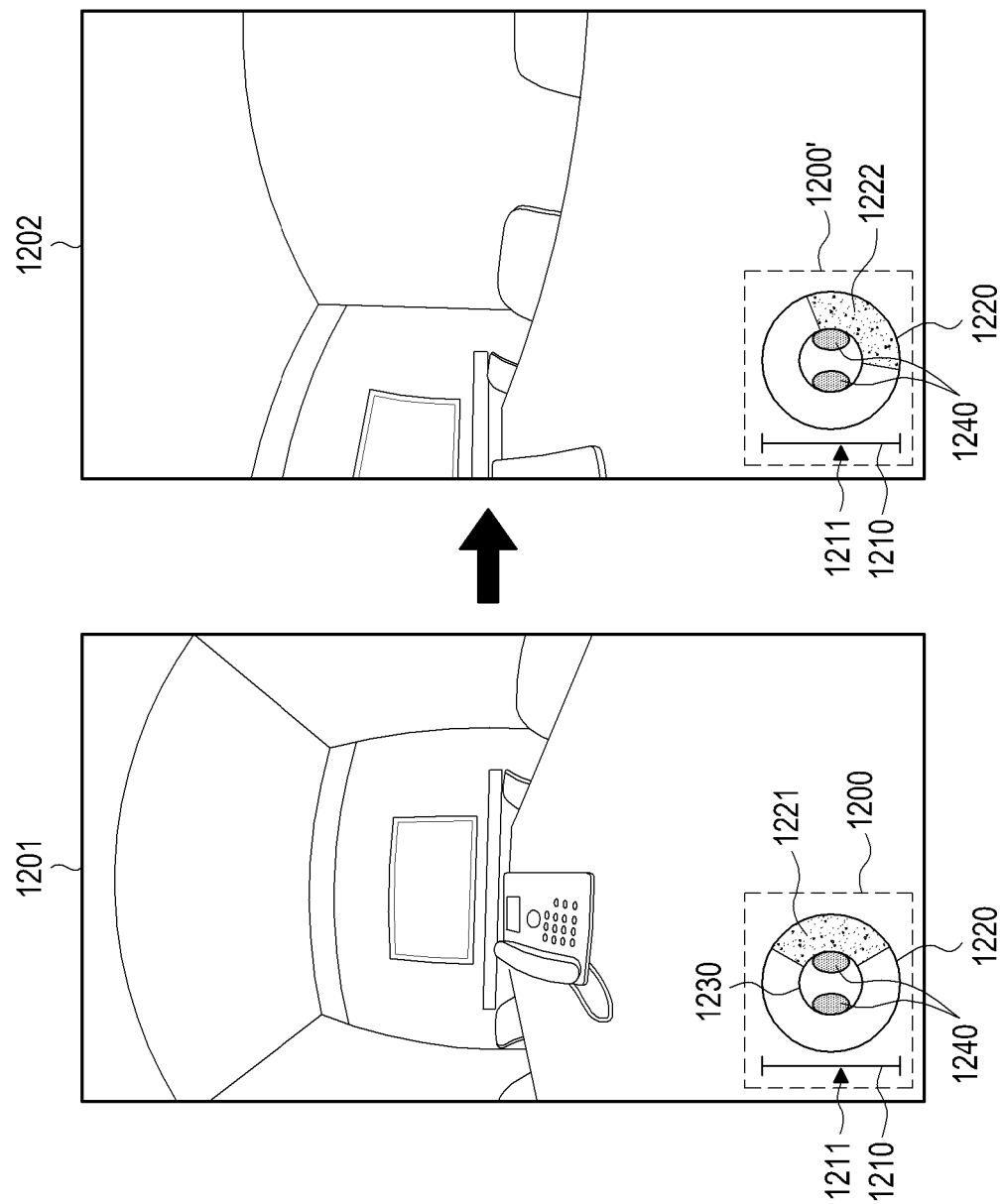
FIGS. 12A and 12B are views illustrating screens displaying a 360-degree image and a map view, when at least one of horizontal and vertical directions is selected in the map view according to various embodiments of the present disclosure.
Figure 12B:
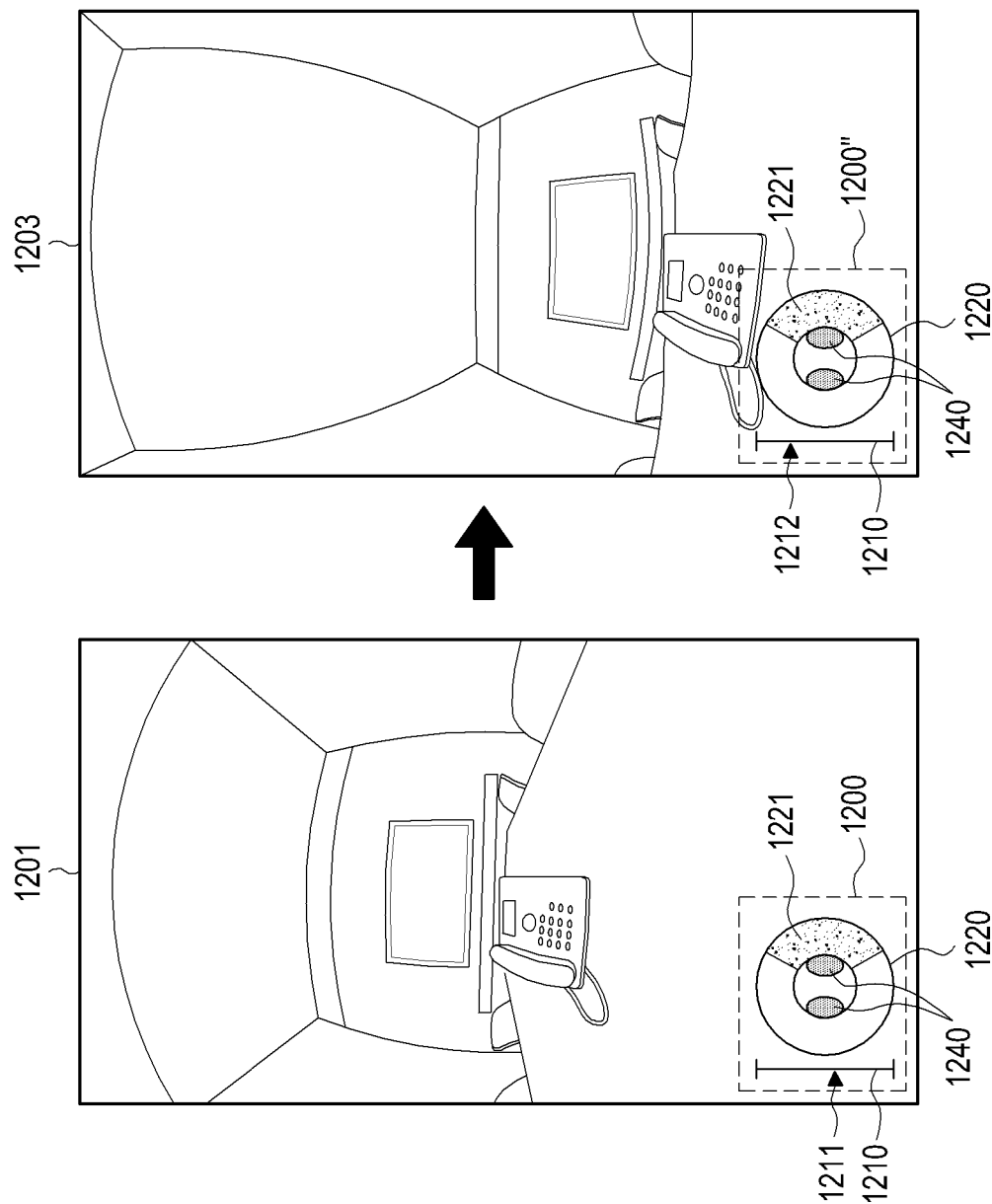

FIGS. 12A and 12B are views illustrating screens displaying a 360-degree image and a map view, when at least one of horizontal and vertical directions is selected in the map view according to various embodiments of the present disclosure.

Referring to FIG. 12A, an electronic device may display an image 1201 of a first area and a first map view 1200 corresponding to the image 1201 of the first area. The first map view 1200 may include a vertical-axis direction 1211 (on indicator 1210) and a horizontal-axis direction 1221 of the image 1201 of the first area, the number and positions 1240 of cameras used to capture the image 1201 of the first area, and an area 1230 indicating whether the image 1201 of the first area is in a zoomed-in or zoomed-out state.

If with the first map view 1201 displayed, the user applies an input for changing the horizontal-axis direction, the electronic device may display an image 1202 of a second area shifted to the right with respect to the horizontal axis according to the changed horizontal-axis direction, and a second map view 1200' corresponding to the image 1202 of the second area. The changed horizontal-axis direction 1222 may be displayed on the second map view 1200'.

Referring to FIG. 12B, if with the first map view 1201 displayed, the user applies an input for changing the vertical-axis direction, the electronic device may display an image 1203 of a third area shifted upward with respect to the vertical axis according to the changed vertical-axis direction, and a third map view 1200" corresponding to the image 1203 of the third area. The changed vertical-axis direction 1212 may be displayed on the third map view 1200".

Figure 13:
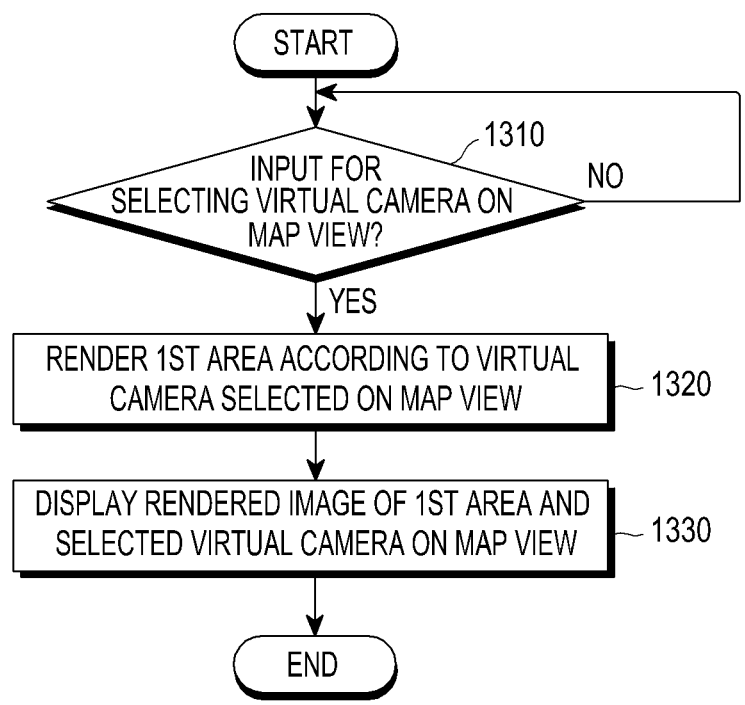
FIG. 13 is a flowchart illustrating an operation for displaying a 360-degree image and a map view, when a virtual camera is selected in the map view according to various embodiments of the present disclosure.

FIG. 13 is a flowchart illustrating an operation for displaying a 360-degree image and a map view, when a virtual camera is selected from the map view according to various embodiments of the present disclosure.

Referring to FIG. 13, an electronic device may determine whether an input for selecting a virtual camera on a map view has been received in operation 1310. According to various embodiments, a user may select an intended virtual camera by means of a third indicator on the map view.

Upon receipt of the input for selecting a virtual camera, the electronic device may render a first area according to the selected camera in a 3D model space. According to various embodiments, upon receipt of a camera selection input through the third indicator on the map view, the electronic device may render an area corresponding to a capturing direction of the selected camera as the first area in operation 1320.

In operation 1330, the electronic device may display the rendered first area, and display the selected virtual camera on the map view.

Figure 14:
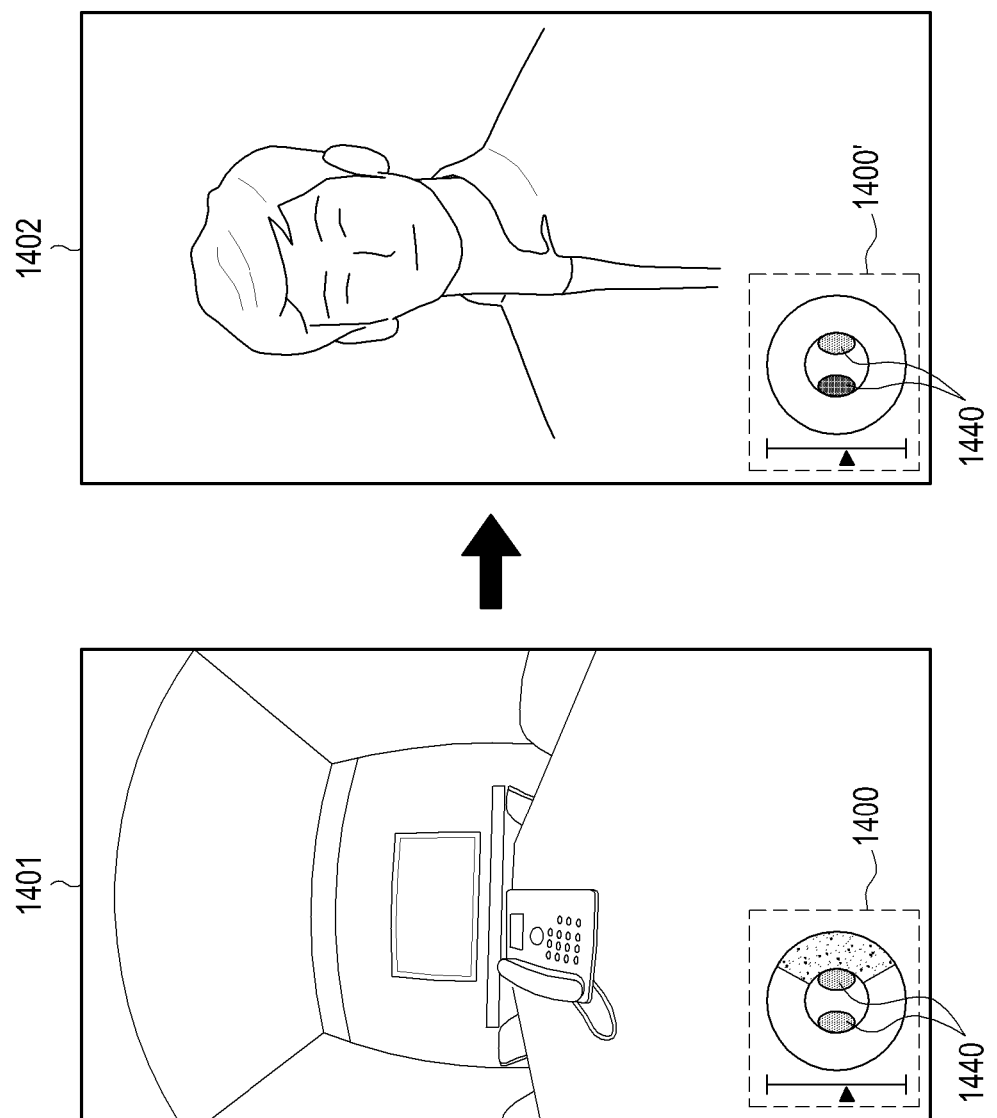
FIG. 14 is a view illustrating a screen displaying a 360-degree image and a map view, when a virtual camera is selected in the map view according to various embodiments of the present disclosure.

FIG. 14 is a view illustrating a screen displaying a 360-degree image and a map view, when a virtual camera is selected in the map view according to various embodiments of the present disclosure.

Referring to FIG. 14, an electronic device may display an image 1401 of a first area and a first map view 1400 corresponding to the image 1401 of the first area. The first map view 1400 may show the number and positions 1440 of cameras used to capture the image 1401 of the first area.

Upon receipt of a camera selection input from a user with the first map view 1400 displayed, the electronic device may display an image 1402 of a second area captured by a selected camera, and a second map view 1400' corresponding to the image 1402 of the second area. The second map view 1400' may indicate the selected camera.

Figure 15:
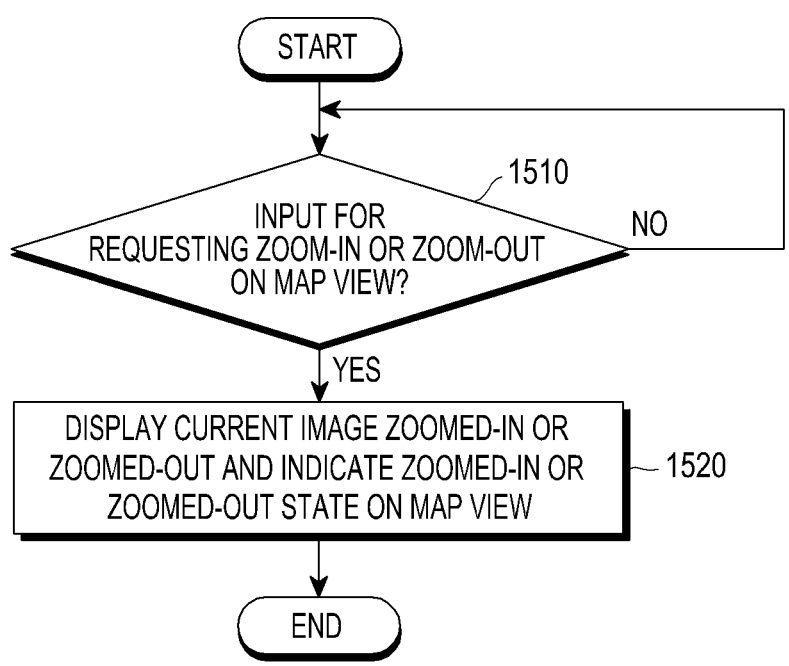
FIG. 15 is a flowchart illustrating an operation for displaying a 360-degree image and a map view according to a zoom-in request or a zoom-out request in the map view according to various embodiments of the present disclosure.

FIG. 15 is a flowchart illustrating an operation for displaying a 360-degree image and a map view according to a request for zoom-in or zoom-out in the map view according to various embodiments of the present disclosure.

Referring to FIG. 15, an electronic device may determine whether an input for requesting zoom-in or zoom-out on a map view has been received in operation 1510. According to various embodiments, a user may apply a zoom-in request input or a zoom-out request input by means of a fourth indicator on the map view.

Upon receipt of the zoom-in request input or the zoom-out request input, the electronic device may zoom in or zoom out a current displayed image, and indicate whether the image is a zoomed-in or zoomed-out image on the map view in operation 1520.

Figure 16:
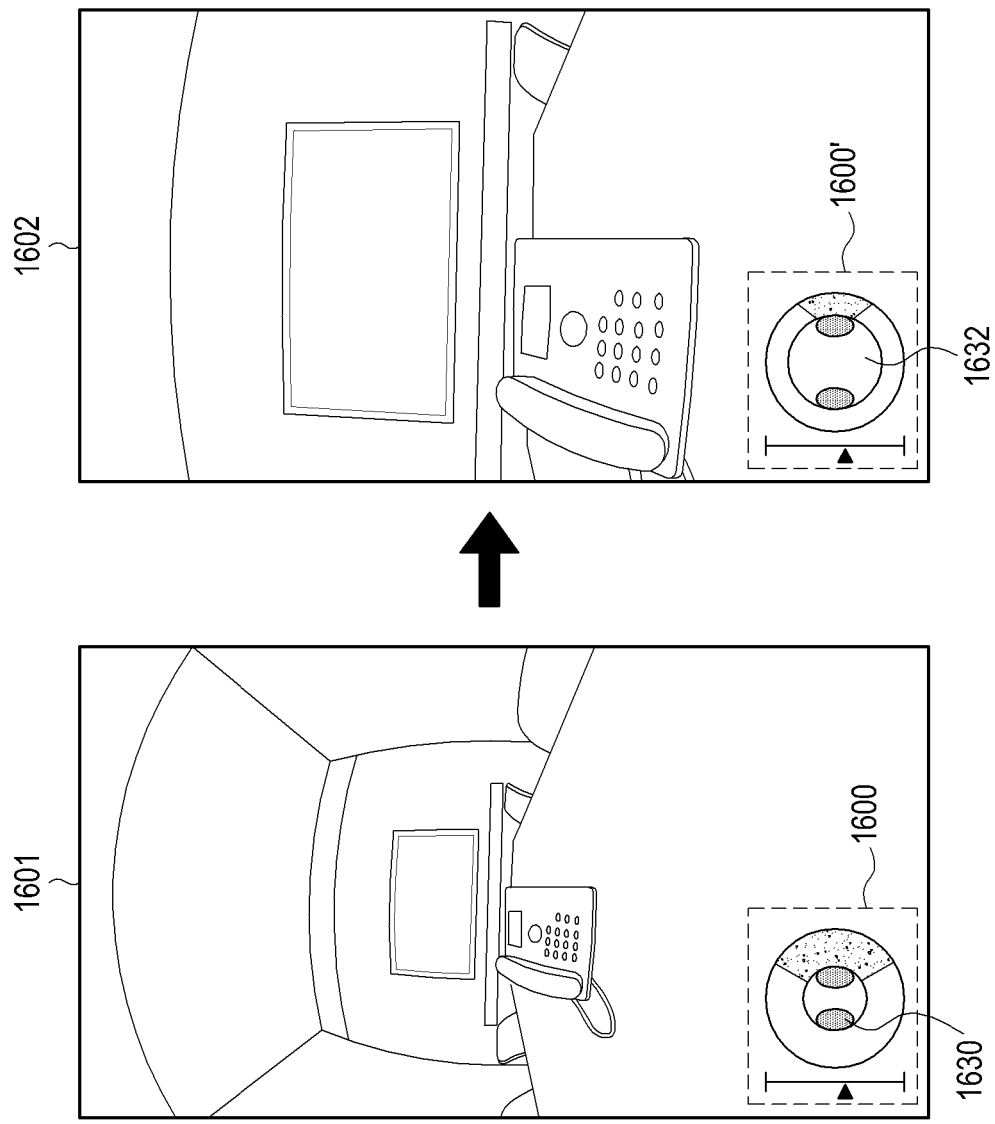
FIG. 16 is a view illustrating a screen displaying a 360-degree image and a map view according to a zoom-in request or a zoom-out request in the map view according to various embodiments of the present disclosure.

FIG. 16 is a view illustrating a screen displaying a 360-degree image and a map view according to a request for zoom-in or zoom-out in the map view according to various embodiments of the present disclosure.

Referring to FIG. 16, the electronic device may display an image 1601 of a first area and a first map view 1600 corresponding to the image 1601 of the first area. The first map view 1600 may display a fourth indicator 1630 indicating a zoomed-in or zoomed-out state of the image 1601 of the first area.

Figure 17:
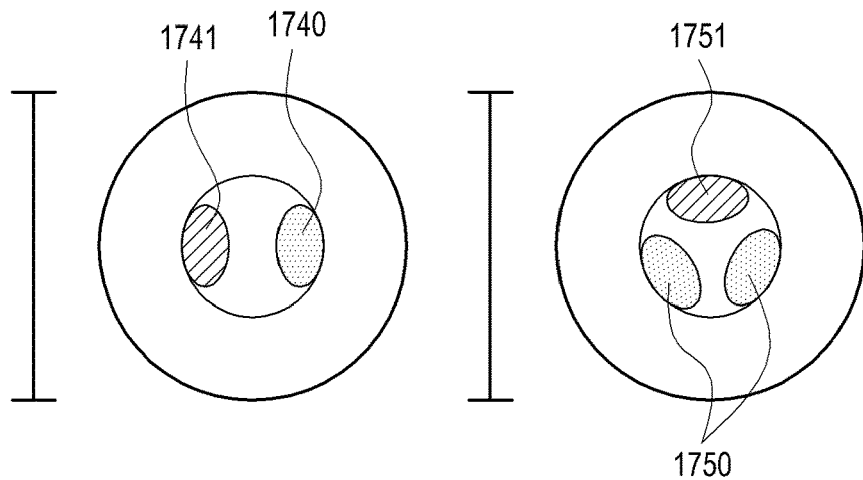
FIGS. 17, 18 and 19 are views illustrating display of virtual cameras in a map view according to various embodiments of the present disclosure.
Figure 18:
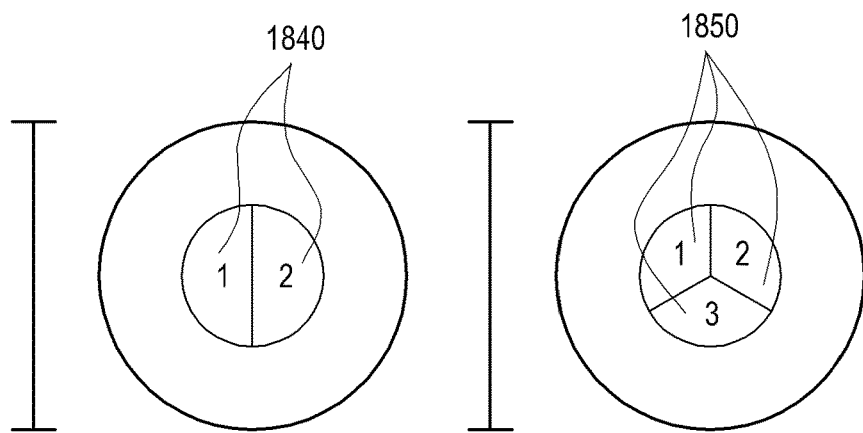
Figure 19:
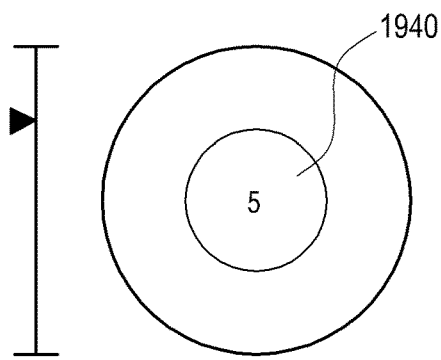

FIGS. 17, 18 and 19 are views illustrating display of virtual cameras in a map view according to various embodiments of the present disclosure.

Referring to FIGS. 17, 18 and 19, the electronic device may display a third indicator indicating two cameras (1740, 1741 or 1840) or three cameras (1750, 1751 or 1850) or one camera (1940).

While the positions and number of cameras have been described above, taking an example, it is obvious that the positions and number of cameras may be represented in any other manner.

As is apparent from the foregoing description, according to various embodiments of the present disclosure, since which one of a plurality of cameras has captured a current displayed image of a specific view of a whole 360-degree image is indicated, a user may select a specific camera from among a plurality of cameras, and thus view an image captured by the selected camera in the 360-degree image.

Further, according to various embodiments of the present disclosure, information indicating the direction of a view corresponding to a current displayed image of a whole 360-degree image, among horizontal directions (for example, left and right directions) and vertical directions (for example, up and down directions) is provided, and a user is allowed to select horizontal and vertical directions for an image of an intended view to be displayed. Thus, the user may conveniently select a view that the user wants to see.

Further, according to various embodiments of the present disclosure, in the case where a current displayed image of a view out of a whole 360-degree image has been zoomed in or zoomed out, information indicating the zoomed-in state or zoomed-out state of the current displayed image is provided. Therefore, the user may conveniently view the 360-degree image.

Each of the above-described components of the electronic device may include one or more parts and the name of the component may vary with the type of the electronic device. According to various embodiments, an electronic device may be configured to include at least one of the components described in the present disclosure, and some component may be omitted from or added to the electronic device. Further, one entity may be configured by combining a part of the components of the electronic device, to thereby perform the same functions of the components prior to the combining.

The term "module" as used herein may refer to a unit including one or a combination of two or more of hardware, software, and firmware. The term "module" may be used interchangeably with terms such as, for example, unit, logic, logical block, component, or circuit. A "module" may be the smallest unit of an integrated part or a portion thereof. A "module" may be the smallest unit for performing one or more functions, or a portion thereof. A "module" may be implemented mechanically, or electronically. For example, a "module" may include at least one of a known, or to-be-developed, application-specific integrated circuit (ASIC) chip, field-programmable gate array (FPGA) or programmable logic device that perform certain operations.

At least a part of devices (for example, modules or their functions) or methods (for example, operations) according to various embodiments of the present disclosure may be implemented as commands stored in a computer-readable storage medium (for example, the memory 130), in the form of a programming module. When the commands are executed by a processor (for example, the processor 120), the processor may execute functions corresponding to the commands. The computer-readable medium may include hard disk, floppy disk, magnetic media (for example, magnetic tape), optical media (for example, compact disc ROM (CD-ROM)), DVD, magneto-optical media (for example, floptical disk), hardware devices (for example, ROM, RAM or flash memory)), and the like. Program instructions may include machine language code that are produced by a compiler or high-level language code that may be executed by a computer using an interpreter.

A module or a programming module according to various embodiments of the present disclosure may include one or more of the above-described components, may omit a portion thereof, or may include additional components. Operations that are performed by a module, a programming module or other components according to the present disclosure may be processed in a serial, parallel, repetitive or heuristic manner. Also, some operations may be performed in a different order or omitted, or additional operations may be added.

According to various embodiments of the present disclosure, a storage medium may store a program, and the program may perform operations. The operations may include acquiring 360-degree image data and metadata corresponding to the 360-degree image data, and displaying an object including a first indicator and a second indicator on a display, using the metadata, the first indicator indicating an angle of view or capturing direction x along a horizontal direction in a three-dimensional (3D) model space for a first area of the 360-degree image data, and the second indicator indicating an angle of view or capturing direction y along a vertical direction in the 3D model space.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:
1. An electronic device comprising:
a display; and
at least one processor operatively connected to the display,
wherein the at least one processor is configured to:
acquire 360-degree image data corresponding to a 360-degree image and metadata corresponding to the 360-degree image data, and
display a part of the 360-degree image and an object including a plurality of indicators, on the display using the metadata,
wherein the plurality of indicators include a first camera indicator and a second camera indicator,
wherein the first camera indicator indicates a first camera positioned in a first position within a three-dimensional (3D) model space related to the 360-degree image and is configured to be used to capture a first part of the 360-degree image, and the second camera indicator indicates a second camera in a second position within the 3D model space related to the 360-degree image and is configured to be used to capture a second part of the 360-degree image, wherein when the first camera indicator is selected, the first part of the 360-degree image is displayed on the display, and wherein when the second camera indicator is selected, the second part of the 360-degree image is displayed on the display.

2. The electronic device of claim 1,
wherein the plurality of indicators further include a first indicator and a second indicator,
wherein the first indicator indicates an angle of view or capturing x-direction along a horizontal direction in the 3D model space for a first area of the 360-degree image data, and
wherein the second indicator indicates an angle of view or capturing y-direction along a vertical direction in the 3D model space.

3. The electronic device of claim 2, wherein the at least one processor is further configured to generate the plurality of indicators further including a fourth indicator indicating whether the first area of the 360-degree image data has been zoomed in or zoomed out.

4. The electronic device of claim 2, wherein, upon receipt of an input for changing the horizontal direction through the first indicator on the object, the at least one processor is further configured to display an image of a second area of the 360-degree image data corresponding to the changed horizontal direction on the display according to the input.

5. The electronic device of claim 2, wherein, upon receipt of an input for changing the vertical direction through the second indicator on the object, the at least one processor is further configured to display an image of a third area of the 360-degree image data corresponding to the changed vertical direction on the display according to the input.

6. The electronic device of claim 3, wherein, upon receipt of a zoom-in command or a zoom-out command for the first area of the 360-degree image data through the fourth indicator on the object, the at least one processor is further configured to display the image of the first area of the 360-degree image data zoomed-in or zoomed-out according to the zoom-in command or the zoom-out command on the display.

7. The electronic device of claim 1, wherein the plurality of indicators further include an indicator indicating a number of virtual cameras.

8. The electronic device of claim 7, wherein the number of the virtual cameras are indicated by a numeral.

9. A method for displaying a 360-degree image in an electronic device, the method comprising:
acquiring 360-degree image data corresponding to a 360-degree image and metadata corresponding to the 360-degree image data; and
displaying an image of a first area of the 360-degree image data and an object including a plurality of indicators on a display, using the metadata,
wherein the plurality of indicators include a first camera indicator and a second camera indicator,
wherein the first camera indicator indicates a first camera positioned in a first position within a three-dimensional (3D) model space related to the 360-degree image and is configured to be used to capture a first part of the 360-degree image, and the second camera indicator indicates a second camera in a second position within the 3D model space related to the 360-degree image and is configured to be used to capture a second part of the 360-degree image, wherein when the first camera indicator is selected, the first part of the 360-degree image is displayed on the display, and wherein when the second camera indicator is selected, the second part of the 360-degree image is displayed on the display.

10. The method of claim 9,
wherein the plurality of indicators further include a first indicator and a second indicator,
wherein the first indicator indicates an angle of view or capturing x-direction along a horizontal direction in the 3D model space for a first area of the 360-degree image data, and
wherein the second indicator indicates an angle of view or capturing y-direction along a vertical direction in the 3D model space.

11. The method of claim 10, wherein the plurality of indicators further includes a fourth indicator indicating whether the first area of the 360-degree image data has been zoomed in or zoomed out.

12. The method of claim 10, further comprising:
upon receipt of an input for changing the horizontal direction through the first indicator of the object, displaying an image of a second area of the 360-degree image data corresponding to the changed horizontal direction on the display according to the input.

13. The method of claim 10, further comprising:
upon receipt of an input for changing the vertical direction through the second indicator of the object, displaying an image of a third area of the 360-degree image data corresponding to the changed vertical direction on the display according to the input.

14. The method of claim 11, further comprising:
upon receipt of a zoom-in command or a zoom-out command for the first area of the 360-degree image data through the fourth indicator of the object, displaying the image of the first area of the 360-degree image data zoomed-in or zoomed-out on the display according to the zoom-in command or the zoom-out command.

15. The method of claim 9, wherein the plurality of indicators further include an indicator indicating a number of virtual cameras.

16. The method of claim 15, wherein the number of virtual cameras are indicated by a numeral.

17. A non-transitory computer-readable storage medium configured to store one or more computer programs including instructions for displaying a 360-degree image in an electronic device that, when executed by at least one processor, cause the at least one processor to control for:
acquiring 360-degree image data corresponding to a 360-degree image and metadata corresponding to the 360-degree image data; and
displaying an image of a first area of the 360-degree image data and an object including a plurality of indicators on a display, using the metadata,
wherein the plurality of indicators include a first camera indicator and a second camera indicator,
wherein the first camera indicator indicates a first camera positioned in a first position within a three-dimensional (3D) model space related to the 360-degree image and is configured to be used to capture a first part of the 360-degree image, and the second camera indicator indicates a second camera in a second position within the 3D model space related to the 360-degree image and is configured to be used to capture a second part of the 360-degree image, wherein when the first camera indicator is selected, the first part of the 360-degree image is displayed on the display, and wherein when the second camera indicator is selected, the second part of the 360-degree image is displayed on the display.

18. The electronic device of claim 17, wherein the plurality of indicators further include a first indicator and a second indicator, wherein the first indicator indicates an angle of view or capturing x-direction along a horizontal direction in the 3D model space for a first area of the 360-degree image data, wherein the second indicator indicates an angle of view or capturing y-direction along a vertical direction in the 3D model space, and wherein the plurality of indicators further include a map view of the 360-degree image data.

* * * * *